(12) United States Patent
Saha et al.

(10) Patent No.: US 10,589,402 B2
(45) Date of Patent: Mar. 17, 2020

(54) ABRASIVE ARTICLES AND METHODS OF FORMING THE SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Naresh Saha, Chennai (IN); Varadharajan Ranganathan, Chennai (IN); Sabine Schmidt, Norderstedt (DE)

(73) Assignees: SAINT-GOBAIN ABRASIVES, INC., Worchester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 16/010,638

(22) Filed: Jun. 18, 2018

(65) Prior Publication Data

US 2018/0361539 A1 Dec. 20, 2018

Related U.S. Application Data

(60) Provisional application No. 62/546,144, filed on Aug. 16, 2017.

(30) Foreign Application Priority Data

Jun. 19, 2017 (IN) .............................. 201741021334

(51) Int. Cl.
| | | |
|---|---|---|
| *B24D 3/34* | (2006.01) | |
| *B24D 3/06* | (2006.01) | |
| *B24D 3/10* | (2006.01) | |
| *C09K 3/14* | (2006.01) | |

(52) U.S. Cl.
CPC .............. *B24D 3/342* (2013.01); *B24D 3/06* (2013.01); *B24D 3/10* (2013.01); *C09K 3/1436* (2013.01); *C09K 3/1445* (2013.01)

(58) Field of Classification Search
CPC . B24D 3/342; B24D 3/06; B24D 3/10; C09K 3/1436; C09K 3/1445
See application file for complete search history.

(56) References Cited

U.S. PATENT DOCUMENTS

| 4,977,710 A | 12/1990 | Une |
|---|---|---|
| 7,377,477 B2 | 5/2008 | Lucek et al. |
| 8,894,731 B2 | 11/2014 | Ramanath et al. |
| 2007/0020457 A1 | 1/2007 | Adefris |
| 2010/0000159 A1* | 1/2010 | Walia ........................ B24D 3/06 51/296 |
| 2014/0033617 A1 | 2/2014 | Li et al. |
| 2014/0137482 A1 | 5/2014 | Li et al. |
| 2015/0033636 A1* | 2/2015 | Li ............................ B24D 3/28 51/298 |

FOREIGN PATENT DOCUMENTS

| JP | 2012086304 A | 5/2012 |
|---|---|---|
| WO | 2012069266 A1 | 5/2012 |

OTHER PUBLICATIONS

Liu, L. et al., "Microstructure and the properties of FeCoCuNiSnx high entropy alloys," Materials Science and Engineering A, 2012, pp. 64-68, vol. 548.
International Search Report and Written Opinion for PCT/US2018/037989, dated Oct. 30, 2018, 11 pages.

* cited by examiner

*Primary Examiner* — Pegah Parvini
(74) *Attorney, Agent, or Firm* — Abel Schillinger, LLP; Joseph P. Sullivan

(57) ABSTRACT

An abrasive article is provided that may include a body. The body may include a bond component and abrasive particles within the bond component. The bond component may include a Fe—Co—Cu—Ni—Sn based bond material and a performance enhancing material. The performance enhancing material may include hex-boron nitride. The content of the performance enhancing material may be at least about 6 vol. % and not greater than about 14 vol. % for a total volume of the bond component.

20 Claims, 6 Drawing Sheets

ABRASIVE ARTICLES AND METHODS OF FORMING THE SAME

CROSS-REFERENCE TO RELATED APPLICATION(S)

The present application claims priority under 35 U.S.C. § 119(a)-(d) to Indian Patent Application No. 201741021334, filed Jun. 19, 2017, entitled "ABRASIVE ARTICLES AND METHODS OF FORMING THE SAME," naming as inventors Naresh SAHA et al., and claims priority under 35 U.S.C. § 119(e) to U.S. Provisional Patent Application No. 62/546,144, filed Aug. 16, 2017, entitled "ABRASIVE ARTICLES AND METHODS OF FORMING THE SAME," naming as inventors Naresh SAHA et al, which applications are assigned to the current assignees hereof and are incorporated by reference herein in their entireties.

BACKGROUND

Field of the Disclosure

The following is directed to an abrasive article and a method of forming an abrasive article. More particularly, the following is directed to an abrasive article including abrasive particles within a bond material.

Description of the Related Art

Abrasive articles used in machining applications typically include bonded abrasive articles and coated abrasive articles. Coated abrasive articles are generally layered articles having a backing and an adhesive coat to fix abrasive particles to the backing, the most common example of which is sandpaper. Bonded abrasive articles consist of rigid, and typically monolithic, three-dimensional, abrasive composites in the form of wheels, discs, segments, mounted points, hones and other article shapes, which can be mounted onto a machining apparatus, such as a grinding, polishing or cutting apparatus. Some bonded abrasive articles may be particularly useful in grinding, shaping or cutting certain types of workpieces, including for example, ceramic materials as used in refractory products.

Accordingly, the industry continues to demand improved bonded abrasive articles and methods for their use.

SUMMARY

According to a first aspect, an abrasive article may include a body. The body may include a bond component and abrasive particles within the bond component. The bond component may include a Fe—Co—Cu—Ni—Sn based bond material and a performance enhancing material. The performance enhancing material may include hex-boron nitride. The content of the performance enhancing material may be at least about 6 vol. % and not greater than about 14 vol. % for a total volume of the bond component.

According to another aspect, an abrasive article may include a body. The body may include a bond component and abrasive particles within the bond component. The bond component may include a Fe—Co—Cu—Ni—Sn based bond material and a performance enhancing material. The performance enhancing material may include hex-boron nitride. The body may include a hardness of at least about 50 HRB and not greater than about 85 HRB.

According to still another aspect, an abrasive article comprising a body. The body may include a continuous bond material phase, abrasive particles within the continuous bond material phase and a discontinuous performance enhancing material phase dispersed within the continuous bond material phase. The bond material phase may include a Fe—Co—Cu—Ni—Sn based bond material. A hardness of the performance enhancing material phase $H_{PEMP}$ may be less than a hardness of the bond material phase $H_{BMP}$.

According to yet another aspect, a method of forming an abrasive article may include providing an abrasive article forming mixture, and forming the abrasive article forming mixture into the abrasive article. The abrasive article forming mixture may include a bond forming mixture, and abrasive particles. The bond forming mixture may include an unprocessed bond material and an unprocessed performance enhancing material. The unprocessed bond material may include a Fe—Co—Cu—Ni—Sn based bond material. The unprocessed performance enhancing material may include hex-boron nitride. The content of the unprocessed performance enhancing material in the abrasive article forming mixture is at least about 6 vol. % and not greater than about 14 vol. % for a total volume of the bond forming mixture.

According to still another aspect, a method of forming an abrasive article may include providing an abrasive article forming mixture; and forming the mixture into the abrasive article. The bond forming mixture may include an unprocessed bond material and an unprocessed performance enhancing material. The unprocessed bond material may include a Fe—Co—Cu—Ni—Sn based bond material. The unprocessed performance enhancing material may include hex-boron nitride. The abrasive article may include a body and the body may have a hardness of at least about 50 HRB and not greater than about 85 HRB.

According to yet another aspect, a method of forming an abrasive article may include providing an abrasive article forming mixture and forming the mixture into the abrasive article. The abrasive article may include a continuous bond material phase, abrasive particles within the continuous bond material phase and a discontinuous performance enhancing material phase dispersed within the continuous bond material phase. The bond material phase may include a Fe—Co—Cu—Ni—Sn based bond material. A hardness of the performance enhancing material phase $H_{PEMP}$ may be less than a hardness of the bond material phase $H_{BMP}$.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Abrasive articles and techniques are disclosed that can be used for grinding, including for example, grinding of various workpieces, such as ceramics and glass. According to particular embodiments, abrasive articles described herein may be used for grinding refractory materials, and have been demonstrated to have improved performance, life, and efficiency over conventional grinding tools used in grinding refractory materials.

According to particular embodiments, abrasive articles as described herein may include abrasive particles within a bond component. The bond component may include a Fe—Co—Cu—Ni—Sn based bond material and a performance enhancing material.

According to certain embodiments, the Fe—Co—Cu—Ni—Sn based bond material may be defined as bond material having a total content of iron (Fe), cobalt (Co), copper (Cu), nickel (Ni) and tin (Sn) that accounts for a majority of the total volume of the bond material, such as, at least about 50 vol. % for a total volume of the bond material.

According to yet other embodiments, the performance enhancing material may include hexagonal boron nitride (hBN). According to yet other embodiments, the performance enhancing material may consist essentially of hexagonal boron nitride.

Figure 1:
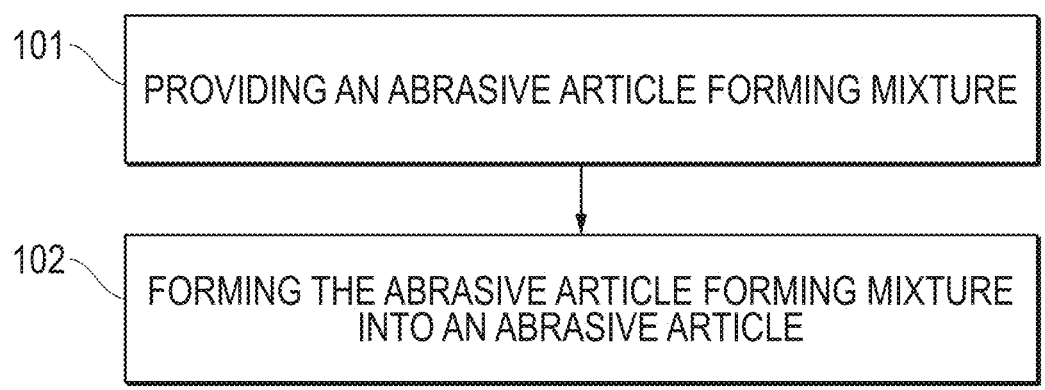
FIG. 1 includes a flow chart illustrating a process for forming an abrasive article according to embodiments described herein.

FIG. 1 includes a flow chart illustrating a method of forming an abrasive article in accordance with embodiments described herein. As illustrated in FIG. 1, a process 100 can be initiated at step 101 by providing an abrasive article forming mixture containing abrasive particles and bond forming mixture. The bond forming mixture may include an unprocessed bond material and an unprocessed performance enhancing material. Reference herein to "unprocessed" materials refers to starting materials that may or may not necessarily undergo a chemical or physical change during processing.

According to yet other embodiments, the abrasive article forming mixture may include a particular content of the abrasive particles. For example, the abrasive article forming mixture may include an abrasive particle content of at least about 5 vol. % for a total volume of the abrasive article forming mixture, such as, at least about 6 vol. % or at least about 7 vol. % or at least about 8 vol. % or at least about 9 vol. % or at least about 10 vol. % or at least about 11 vol. % or at least about 12 vol. % or at least about 13 vol. % or even at least about 14 vol. %. According to still another embodiment, the abrasive article forming mixture may include an abrasive particle content of not greater than about 25 vol. %, such as, not greater than about 24 vol. % or not greater than about 23 vol. % or not greater than about 22 vol. % or not greater than about 21 vol. % or not greater than about 20 vol. % or not greater than about 19 vol. % or not greater than about 18 vol. % or not greater than about 17 vol. % or not greater than about 16 vol. % or even not greater than about 15 vol. %. It will be appreciated that the abrasive article forming mixture may include an abrasive particle content of any value between any of the minimum and maximum values noted above. It will be further appreciated that the abrasive article forming mixture may include an abrasive particle content of any value within a range between any of the minimum and maximum values noted above.

According to yet another embodiment, the abrasive particles can include an inorganic material, such as a naturally occurring material (e.g., a mineral) or synthetically created composition. Some suitable inorganic materials may include oxides, carbides, nitrides, oxycarbides, oxynitrides, diamonds, other natural minerals or a combination thereof. In certain, non-limiting embodiments, the abrasive particle may be cubic boron nitride (cBN), fused alumina, sintered alumina, silicon carbide, or mixtures thereof.

Accordingly to yet another embodiment, the abrasive particles may be a superabrasive material. In certain other embodiments, the abrasive material may include a material selected from the group consisting of diamond, cubic boron nitride, and a combination thereof. In still other embodiments, the super abrasive material may consist essentially of diamond. In still other embodiments, the super abrasive material may consist essentially of cubic boron nitride. In still other embodiments the super abrasive material may have a Mohs hardness of at least about 8, such as, at least about 8.5 or even at least about 9.

According to still other embodiments, the abrasive particles may have a particular average particle size. For example, the abrasive particles may have an average particle size of at least about 100 microns, such as, at least about 150 microns or at least about 200 microns or at least about 250 microns or at least about 300 microns or at least about 350 microns or at least about 400 microns or even at least about 450 microns. According to still other embodiments, the abrasive particles may have an average particle size of not greater than about 1000 microns, such as, not greater than about 950 microns or not greater than about 900 microns or not greater than about 850 microns or not greater than about 800 microns or not greater than about 750 microns or not greater than about 700 microns or not greater than about 650 microns or not greater than about 600 microns or even not greater than about 550 microns. It will be appreciated that the abrasive particles may have an average particle size of any value between any of the minimum and maximum values noted above. It will be further appreciated that the abrasive particles may have an average particle size any value within a range between any of the minimum and maximum values noted above.

According to still another embodiment, the abrasive particles may include a coating, which may facilitate formation and performance of the abrasive article. In certain embodiments, the coating may be a metal coating, for example, nickel. According to still other embodiments, the coating may be iron oxide, a silane, such as, gamma amino propyl triethoxy silane, or even silica.

According to still other embodiments, the coating of the abrasive particles may have a specific thickness. For example, the average thickness of the coating of the abrasive particles can be at least about 1.25 microns, such as, at least about 1.5 microns, at least about 1.75 microns, at least about 2.0 microns, at least about 2.25 microns, at least about 2.5 microns, or at least about 3.0 microns. The average thickness can be limited, however, such as not greater than about 8.0 microns, not greater than about 7.5 microns, not greater than 7.0 microns, not greater than 6.5 microns, not greater than 6.0 microns, not greater than 5.5 microns, not greater than 5.0 microns, not greater than 4.5 microns, or not greater than 4.0 microns. It will be appreciated that the average thickness of the coating may be any value between any of the minimum and maximum values noted above. It will be further appreciated that the average thickness of the coating may be any value within a range between any of the minimum and maximum values noted above.

According to other embodiments, the coating of the abrasive particles can be formed to overlie specific portion of the exterior surface of the abrasive particle. For example, the coating may overly at least about 50% of the exterior surface area of the abrasive particle, such as, at least about 60%, at least about 70%, at least about 80%, at least about 90%, even at least about 95%, or essentially the entire exterior surface of the abrasive particles. In still other non-limiting embodiments, the coating may overly not greater than about 99% of the exterior surface area of the abrasive particle, such as, not greater than about 95%, not greater than about 90%, not greater than about 80%, not greater than about 70% or even not greater than about 60% of the exterior surface of the abrasive particles. It will be appreciated that the coating may overly any percent of the abrasive particle between any of the minimum and maximum values noted above. It will be further appreciated that the coating may overly any percent of the abrasive particle within a range between any of the minimum and maximum values noted above.

In further reference to the abrasive particles, the morphology of the abrasive particles may be described by an aspect ratio, which is a ratio between the dimensions of length to width. It will be appreciated that the length is the longest dimension of the abrasive particle and the width is the second longest dimension of a given abrasive particle. In accordance with embodiments herein, the abrasive particles may have an aspect ratio (length:width) of not greater than about 2:1 or even not greater than about 1.5:1. In particular instances, the abrasive particles may be essentially equiaxed, such that they have an aspect ratio of approximately 1:1.

According to yet other embodiments, the abrasive article forming mixture may include a particular content of the bond forming mixture. For example, the abrasive article forming mixture may include a bond forming mixture content of at least about 55 vol. % for a total volume of the abrasive article forming mixture, such as, at least about 58 vol. % or at least about 60 vol. % or at least about 63 vol. % or at least about 65 vol. % or at least about 68 vol. % or at least about 70 vol. % or at least about 73 vol. % or at least about 75 vol. % or at least about 78 vol. % or at least about 80 vol. % or at least about 83 vol. % or at least about 85 vol. % or at least about 88 vol. % or even at least about 90 vol. %. According to still another embodiment, the abrasive article forming mixture may include a bond forming mixture content of not greater than about 95 vol. %, such as, not greater than about 92 vol. % or not greater than about 90 vol. % or not greater than about 87 vol. % or not greater than about 85 vol. % or not greater than about 82 vol. % or not greater than about 80 vol. % or not greater than about 77 vol. % or not greater than about 75 vol. % or not greater than about 72 vol. % or not greater than about 70 vol. % or not greater than about 67 vol. % or even not greater than about 65 vol. %. It will be appreciated that the abrasive article forming mixture may include a bond forming mixture content of any value between any of the minimum and maximum values noted above. It will be further appreciated that the abrasive article forming mixture may include a bond forming mixture content of any value within a range between any of the minimum and maximum values noted above.

According to yet other embodiments, the bond forming mixture may include a particular content of the unprocessed bond material. For example, the bond forming mixture may include an unprocessed bond material content of at least about 60 vol. % for a total volume of the bond forming mixture, such as, at least about 63 vol. % or at least about 63 vol. % or at least about 68 vol. % or at least about 70 vol. % or at least about 73 vol. % or at least about 75 vol. % or at least about 78 vol. % or at least about 80 vol. % or at least about 83 vol. % or at least about 85 vol. % or at least about 88 vol. % or even at least about 90 vol. %. According to still another embodiment, the bond forming mixture may include an unprocessed bond material content of not greater than about 94 vol. %, such as, not greater than about 92 vol. % or not greater than about 90 vol. % or not greater than about 87 vol. % or not greater than about 85 vol. % or not greater than about 82 vol. % or not greater than about 80 vol. % or not greater than about 77 vol. % or not greater than about 75 vol. % or not greater than about 72 vol. % or not greater than about 70 vol. % or not greater than about 67 vol. % or even not greater than about 65 vol. %. It will be appreciated that the bond forming mixture may include an unprocessed bond material content of any value between any of the minimum and maximum values noted above. It will be further appreciated that the bond forming mixture may include an unprocessed bond material content of any value within a range between any of the minimum and maximum values noted above.

According to still other embodiments, the unprocessed bond material may include an unprocessed Fe—Co—Cu—Ni—Sn based bond material. The unprocessed Fe—Co—Cu—Ni—Sn based bond material may be defined as an unprocessed bond material having a total content of iron (Fe), cobalt (Co), copper (Cu), nickel (Ni) and tin (Sn) that accounts for a majority of the total volume of the unprocessed bond material, such as, at least about 50 vol. % for a total volume of the bond material.

According to still other embodiments, the bond forming mixture may include a particular content of iron (Fe). For example, the bond forming mixture may include an iron (Fe) content of at least about 30 vol. % for a total volume of the bond forming mixture, such as, at least about 35 vol. % or at least about 38 vol. % or at least about 40 vol. % or at least about 43 vol. % or at least about 45 vol. % or at least about 48 vol. % or even at least about 50 vol. %. According to yet other embodiments, the bond forming mixture may include an iron (Fe) content of not greater than about 70 vol. % for a total volume of the bond forming mixture, such as, not greater than about 67 vol. % or not greater than about 65 vol. % or not greater than about 62 vol. % or not greater than about 60 vol. % or not greater than about 57 vol. % or even not greater than about 55 vol. %. It will be appreciated that the bond forming mixture may include an iron (Fe) content of any value between any of the minimum and maximum values noted above. It will be further appreciated that the bond forming mixture may include an iron (Fe) content of any value within a range between any of the minimum and maximum values noted above.

According to still other embodiments, the unprocessed Fe—Co—Cu—Ni—Sn based bond material in the bond forming mixture may include a particular content of iron (Fe). For example, the unprocessed Fe—Co—Cu—Ni—Sn based bond material may include an iron (Fe) content of at least about 30 vol. % for a total volume of the unprocessed Fe—Co—Cu—Ni—Sn based bond material, such as, at least about 35 vol. % or at least about 38 vol. % or at least about 40 vol. % or at least about 43 vol. % or at least about 45 vol. % or at least about 48 vol. % or even at least about 50 vol. %. According to yet other embodiments, the unprocessed Fe—Co—Cu—Ni—Sn based bond material in the bond forming mixture may include an iron (Fe) content of not greater than about 70 vol. % for a total volume of the unprocessed Fe—Co—Cu—Ni—Sn based bond material, such as, not greater than about 67 vol. % or not greater than about 65 vol. % or not greater than about 62 vol. % or not greater than about 60 vol. % or not greater than about 57 vol. % or even not greater than about 55 vol. %. It will be appreciated that the unprocessed Fe—Co—Cu—Ni—Sn based bond material in the bond forming mixture may include an iron (Fe) content of any value between any of the minimum and maximum values noted above. It will be further appreciated that the unprocessed Fe—Co—Cu—Ni—Sn based bond material in the bond forming mixture may include an iron (Fe) content of any value within a range between any of the minimum and maximum values noted above.

According to still other embodiments, the bond forming mixture may include a particular content of cobalt (Co). For example, the bond forming mixture may include a cobalt (Co) content of at least about 5 vol. % for a total volume of the bond forming mixture, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the bond forming mixture may include a cobalt (Co) content of not greater than about 25 vol. % for a total volume of the bond forming mixture, such as, not greater than about 24 vol. % or not greater than about 23 vol. % or not greater than about 22 vol. % or not greater than about 21 vol. % or not greater than about 20 vol. % or even not greater than about 19 vol. %. It will be appreciated that the bond forming mixture may include a cobalt (Co) content of any value between any of the minimum and maximum values noted above. It will be further appreciated that the bond forming mixture may include a cobalt (Co) content of any value within a range between any of the minimum and maximum values noted above.

According to still other embodiments, the unprocessed Fe—Co—Cu—Ni—Sn based bond material in the bond forming mixture may include a particular content of cobalt (Co). For example, the unprocessed Fe—Co—Cu—Ni—Sn based bond material may include a cobalt (Co) content of at least about 5 vol. % for a total volume of the bond forming mixture, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the unprocessed Fe—Co—Cu—Ni—Sn based bond material in the bond forming mixture may include a cobalt (Co) content of not greater than about 25 vol. % for a total volume of the bond forming mixture, such as, not greater than about 24 vol. % or not greater than about 23 vol. % or not greater than about 22 vol. % or not greater than about 21 vol. % or not greater than about 20 vol. % or even not greater than about 19 vol. %. It will be appreciated that the unprocessed Fe—Co—Cu—Ni—Sn based bond material in the bond forming mixture may include a cobalt (Co) content of any value between any of the minimum and maximum values noted above. It will be further appreciated that the unprocessed Fe—Co—Cu—Ni—Sn based bond material in the bond forming mixture may include a cobalt (Co) content of any value within a range between any of the minimum and maximum values noted above.

According to still other embodiments, the bond forming mixture may include a particular content of copper (Cu). For example, the bond forming mixture may include a copper (Cu) content of at least about 20 vol. % for a total volume of the bond forming mixture, such as, at least about 21 vol. % or at least about 22 vol. % or at least about 23 vol. % or at least about 24 vol. % or at least about 25 vol. % or at least about 26 vol. % or at least about 27 vol. % or at least about 28 vol. % or at least about 29 vol. % or even at least about 30 vol. %. According to yet other embodiments, the bond forming mixture may include a copper (Cu) content of not greater than about 50 vol. % for a total volume of the bond forming mixture, such as, not greater than about 49 vol. % or not greater than about 48 vol. % or not greater than about 47 vol. % or not greater than about 46 vol. % or not greater than about 45 vol. % or not greater than about 44 vol. % or not greater than about 43 vol. % or not greater than about 42 vol. % or not greater than about 41 vol. % or even not greater than about 40 vol. %. It will be appreciated that the bond forming mixture may include a copper (Cu) content of any value between any of the minimum and maximum values noted above. It will be further appreciated that the bond forming mixture may include a copper (Cu) content of any value within a range between any of the minimum and maximum values noted above.

According to still other embodiments, the unprocessed Fe—Co—Cu—Ni—Sn based bond material in the bond forming mixture may include a particular content of copper (Cu). For example, the unprocessed Fe—Co—Cu—Ni—Sn based bond material may include a copper (Cu) content of at least about 20 vol. % for a total volume of the bond forming mixture, such as, at least about 21 vol. % or at least about 22 vol. % or at least about 23 vol. % or at least about 24 vol. % or at least about 25 vol. % or at least about 26 vol. % or at least about 27 vol. % or at least about 28 vol. % or at least about 29 vol. % or even at least about 30 vol. %. According to yet other embodiments, the unprocessed Fe—Co—Cu—Ni—Sn based bond material in the bond forming mixture may include a copper (Cu) content of not greater than about 50 vol. % for a total volume of the bond forming mixture, such as, not greater than about 49 vol. % or not greater than about 48 vol. % or not greater than about 47 vol. % or not greater than about 46 vol. % or not greater than about 45 vol. % or not greater than about 44 vol. % or not greater than about 43 vol. % or not greater than about 42 vol. % or not greater than about 41 vol. % or even not greater than about 40 vol. %. It will be appreciated that the unprocessed Fe—Co—Cu—Ni—Sn based bond material in the bond forming mixture may include a copper (Cu) content of any value between any of the minimum and maximum values noted above. It will be further appreciated that the unprocessed Fe—Co—Cu—Ni—Sn based bond material in the bond forming mixture may include a copper (Cu) content of any value within a range between any of the minimum and maximum values noted above.

According to still other embodiments, the bond forming mixture may include a particular content of nickel (Ni). For example, the bond forming mixture may include a nickel (Ni) content of at least about 5 vol. % for a total volume of the bond forming mixture, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the bond forming mixture may include a nickel (Ni) content of not greater than about 30 vol. % for a total volume of the bond forming mixture, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol.

% or not greater than about 22 vol. % or not greater than about 21 vol. % or not greater than about 20 vol. % or even not greater than about 19 vol. %. It will be appreciated that the bond forming mixture may include a nickel (Ni) content of any value between any of the minimum and maximum values noted above. It will be further appreciated that the bond forming mixture may include a nickel (Ni) content of any value within a range between any of the minimum and maximum values noted above.

According to still other embodiments, the unprocessed Fe—Co—Cu—Ni—Sn based bond material in the bond forming mixture may include a particular content of nickel (Ni). For example, the unprocessed Fe—Co—Cu—Ni—Sn based bond material may include a nickel (Ni) content of at least about 5 vol. % for a total volume of the bond forming mixture, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the unprocessed Fe—Co—Cu—Ni—Sn based bond material in the bond forming mixture may include a nickel (Ni) content of not greater than about 30 vol. % for a total volume of the bond forming mixture, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the unprocessed Fe—Co—Cu—Ni—Sn based bond material in the bond forming mixture may include a nickel (Ni) content of any value between any of the minimum and maximum values noted above. It will be further appreciated that the unprocessed Fe—Co—Cu—Ni—Sn based bond material in the bond forming mixture may include a nickel (Ni) content of any value within a range between any of the minimum and maximum values noted above.

According to still other embodiments, the bond forming mixture may include a particular content of tin (Sn). For example, the bond forming mixture may include a tin (Sn) content of at least about 5 vol. % for a total volume of the bond forming mixture, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the bond forming mixture may include a tin (Sn) content of not greater than about 30 vol. % for a total volume of the bond forming mixture, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the bond forming mixture may include a tin (Sn) content of any value between any of the minimum and maximum values noted above. It will be further appreciated that the bond forming mixture may include a tin (Sn) content of any value within a range between any of the minimum and maximum values noted above.

According to still other embodiments, the unprocessed Fe—Co—Cu—Ni—Sn based bond material in the bond forming mixture may include a particular content of tin (Sn). For example, the unprocessed Fe—Co—Cu—Ni—Sn based bond material may include a tin (Sn) content of at least about 5 vol. % for a total volume of the bond forming mixture, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the unprocessed Fe—Co—Cu—Ni—Sn based bond material in the bond forming mixture may include a tin (Sn) content of not greater than about 30 vol. % for a total volume of the bond forming mixture, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the unprocessed Fe—Co—Cu—Ni—Sn based bond material in the bond forming mixture may include a tin (Sn) content of any value between any of the minimum and maximum values noted above. It will be further appreciated that the unprocessed Fe—Co—Cu—Ni—Sn based bond material in the bond forming mixture may include a tin (Sn) content of any value within a range between any of the minimum and maximum values noted above.

According to particular embodiments described herein, the unprocessed bond material may be in the form of a bond powder. The unprocessed bond particles in the bond powder may have an average diameter, for instance, of not more than 50 microns or even 40 microns or less.

According to yet other embodiments, the bond forming mixture may include a particular content of the unprocessed performance enhancing component. For example, the bond forming mixture may include an unprocessed performance enhancing component content of at least about 6 vol. % for a total volume of the bond forming mixture, such as, at least about 6.25 vol. % or at least about 6.5 vol. % or at least about 6.75 vol. % or at least about 7.0 vol. % or at least about 7.25 vol. % or at least about 7.5 vol. % or at least about 7.75 vol. % or even at least about 8.0 vol. %. According to still another embodiment, the bond forming mixture may include an unprocessed performance enhancing component content of not greater than about 14 vol. %, such as, not greater than about 13.75 vol. % or not greater than about 13.5 vol. % or not greater than about 13.25 vol. % or not greater than about 13.0 vol. % or not greater than about 12.75 vol. % or not greater than about 12.5 vol. % or not greater than about 12.25 vol. % or even not greater than about 12.0 vol. %. It will be appreciated that the bond forming mixture may include an unprocessed performance enhancing component content of any value between any of the minimum and maximum values noted above. It will be further appreciated that the bond forming mixture may include an unprocessed performance enhancing component content of any value within a range between any of the minimum and maximum values noted above.

According to still other embodiments, the unprocessed performance enhancing component may have a particular average particle size. For example, the unprocessed performance enhancing component may have an average particle size of at least about 10 microns, such as, at least about 10.1 microns or at least about 10.2 microns or at least about 10.3 microns or at least about 10.4 microns or at least about 10.5 microns or at least about 10.6 microns or at least about 10.7 microns or at least about 10.8 microns or at least about 10.9 microns or even at least about 11.0 microns. According to still other embodiments microns or not greater than about the unprocessed performance enhancing component may have an average particle size of not greater than about 12 microns, such as, not greater than about 11.9 microns or not greater than about 11.8 microns or not greater than about 11.7 microns or not greater than about 11.6 microns or not greater than about 11.5 microns or not greater than about 11.4 microns or not greater than about 11.3 microns or not greater than about 11.2 or even not greater than about 11.1 microns. It will be appreciated that the unprocessed performance enhancing component may have an average particle size of any value between any of the minimum and maximum values noted above. It will be further appreciated that the unprocessed performance enhancing component may have an average particle size of any value within a range between any of the minimum and maximum values noted above.

According to sill other embodiments, the unprocessed performance enhancing component may include particles having a particular shape. For example, the particles of the performance enhancing component may have a spherical shape. According to still other embodiments, the particles of the performance enhancing component may have an agglomerate shape. According to still other embodiments, the particles of the performance enhancing component may have an irregular shape. According to still other embodiments, the particles of the performance enhancing component may have a platelet shape. According to still other embodiments, the particles of the performance enhancing component may have a dendritic shape. According to still other embodiments, the particles of the performance enhancing component may have a rod like shape.

Referring back to FIG. 1, after providing a mixture in step 101, the process may continue at step 102 by forming a bonded abrasive article from the abrasive article forming mixture, incorporating abrasive particles within the bond forming mixture. The Abrasive article forming mixture may be formed into any desired three-dimensional shape of any desired size, for example, the mixture may be formed into wheels, discs, segments, mounted points, hones and other article shapes, which may be mounted onto a machining apparatus, such as a grinding or polishing apparatus.

In certain embodiments, the mixture may be formed into a bonded abrasive article using hot-pressing. Hot-pressing of the mixture may be carried out at a temperature of at least about 750° C., such as, at least about 800° C., at least about 850° C., at least about 900° C., at least about 950° C. or even at least about 990° C. In still other embodiments, hot-pressing of the mixture may be carried out at a temperature of not greater than about 1000° C., not greater than about 950° C., not greater than about 900° C., not greater than about 850° C., not greater than about 800° C., not greater than about 750° C. or even not greater than about 710° C. It will be appreciated that hot-pressing of the mixture may be carried out at any temperature within a range between any of the minimum and maximum values noted above.

According to other embodiments, hot-pressing of the mixture may be carried out at a pressure of at least about 0.5 tons/in$^2$, such as, at least about 1.0 tons/in$^2$, at least about 1.5 tons/in$^2$, at least about 2.0 tons/in$^2$, at least about 2.5 tons/in$^2$ or even a least about 2.9 tons/in$^2$. In still other embodiments, hot-pressing of the mixture may be carried out at a temperature of not greater than about 3 tons/in$^2$, not greater than about 2.5 tons/in$^2$, not greater than about 2.0 tons/in$^2$, not greater than about 1.5 tons/in$^2$ or even not greater than about 2.0 tons/in$^2$. It will be appreciated that hot-pressing of the mixture may be carried out at any pressure within a range between any of the minimum and maximum values noted above.

In still other embodiments, the mixture may be formed into a bonded abrasive article using cold-pressing. Cold-pressing of the mixture may be carried out at a temperature of at least about 750° C., such as, at least about 800° C., at least about 850° C., at least about 900° C., at least about 950° C. or even at least about 990° C. In still other embodiments, cold-pressing of the mixture may be carried out at a temperature of not greater than about 1000° C., not greater than about 950° C., not greater than about 900° C., not greater than about 850° C., not greater than about 800° C., not greater than about 750° C. or even not greater than about 710° C. It will be appreciated that cold-pressing of the mixture may be carried out at any temperature within a range between any of the minimum and maximum values noted above.

According to other embodiments, cold-pressing of the mixture may be carried out at a pressure of at least about 0.5 tons/in$^2$, such as, at least about 1.0 tons/in$^2$, at least about 1.5 tons/in$^2$, at least about 2.0 tons/in$^2$, at least about 2.5 tons/in$^2$ or even a least about 2.9 tons/in$^2$. In still other embodiments, cold-pressing of the mixture may be carried out at a temperature of not greater than about 3 tons/in$^2$, not greater than about 2.5 tons/in$^2$, not greater than about 2.0 tons/in$^2$, not greater than about 1.5 tons/in$^2$ or even not greater than about 2.0 tons/in$^2$. It will be appreciated that hot-pressing of the mixture may be carried out at any pressure within a range between any of the minimum and maximum values noted above.

In accordance with other embodiments, the formed abrasive article may have a body having particular features. As noted above, according to particular embodiments, the body of the abrasive article may include a bond component and abrasive particles within the bond component.

According to yet other embodiments, the body of the abrasive article may include a particular content of the abrasive particles. For example, the body of the abrasive article may include an abrasive particle content of at least about 5 vol. % for a total volume of the body of the abrasive article, such as, at least about 6 vol. % or at least about 7 vol. % or at least about 8 vol. % or at least about 9 vol. % or at least about 10 vol. % or at least about 11 vol. % or at least about 12 vol. % or at least about 13 vol. % or even at least about 14 vol. %. According to still another embodiment, the body of the abrasive article may include an abrasive particle content of not greater than about 25 vol. %, such as, not greater than about 24 vol. % or not greater than about 23 vol. % or not greater than about 22 vol. % or not greater than about 21 vol. % or not greater than about 20 vol. % or not greater than about 19 vol. % or not greater than about 18 vol. % or not greater than about 17 vol. % or not greater than about 16 vol. % or even not greater than about 15 vol. %. It will be appreciated that the body of the abrasive article may include an abrasive particle content of any value between any of the minimum and maximum values noted above. It will be further appreciated that the body of the abrasive article may include an abrasive particle content of any value within a range between any of the minimum and maximum values noted above.

According to yet another embodiment, the abrasive particles can include an inorganic material, such as a naturally occurring material (e.g., a mineral) or synthetically created composition. Some suitable inorganic materials may include oxides, carbides, nitrides, oxycarbides, oxynitrides, diamonds, other natural minerals or a combination thereof. In certain, non-limiting embodiments, the abrasive particle may be cubic boron nitride (cBN), fused alumina, sintered alumina, silicon carbide, or mixtures thereof.

Accordingly to yet another embodiment, the abrasive particles may be a superabrasive material. In certain other embodiments, the abrasive material may include a material selected from the group consisting of diamond, cubic boron nitride, and a combination thereof. In still other embodiments, the super abrasive material may consist essentially of diamond. In still other embodiments, the super abrasive material may consist essentially of cubic boron nitride. In still other embodiments the super abrasive material may have a Mohs hardness of at least about 8, such as, at least about 8.5 or even at least about 9.

According to still other embodiments, the abrasive particles may have a particular average particle size. For example, the abrasive particles may have an average particle size of at least about 100 microns, such as, at least about 150 microns or at least about 200 microns or at least about 250 microns or at least about 300 microns or at least about 350 microns or at least about 400 microns or even at least about 450 microns. According to still other embodiments, the abrasive particles may have an average particle size of not greater than about 1000 microns, such as, not greater than about 950 microns or not greater than about 900 microns or not greater than about 850 microns or not greater than about 800 microns or not greater than about 750 microns or not greater than about 700 microns or not greater than about 650 microns or not greater than about 600 microns or even not greater than about 550 microns. It will be appreciated that the abrasive particles may have an average particle size of any value between any of the minimum and maximum values noted above. It will be further appreciated that the abrasive particles may have an average particle size any value within a range between any of the minimum and maximum values noted above.

According to still another embodiment, the abrasive particles may include a coating, which may facilitate formation and performance of the abrasive article. In certain embodiments, the coating may be a metal coating, for example, nickel. According to still other embodiments, the coating may be iron oxide, a silane, such as, gamma amino propyl triethoxy silane, or even silica.

According to still other embodiments, the coating of the abrasive particles may have a specific thickness. For example, the average thickness of the coating of the abrasive particles can be at least about 1.25 microns, such as, at least about 1.5 microns, at least about 1.75 microns, at least about 2.0 microns, at least about 2.25 microns, at least about 2.5 microns, or at least about 3.0 microns. The average thickness can be limited, however, such as not greater than about 8.0 microns, not greater than about 7.5 microns, not greater than 7.0 microns, not greater than about 6.5 microns, not greater than 6.0 microns, not greater than about 5.5 microns, not greater than 5.0 microns, not greater than about 4.5 microns, or not greater than 4.0 microns. It will be appreciated that the average thickness of the coating may be any value between any of the minimum and maximum values noted above. It will be further appreciated that the average thickness of the coating may be any value within a range between any of the minimum and maximum values noted above.

According to other embodiments, the coating of the abrasive particles can be formed to overlie specific portion of the exterior surface of the abrasive particle. For example, the coating may overly at least about 50% of the exterior surface area of the abrasive particle, such as, at least about 60%, at least about 70%, at least about 80%, at least about 90%, even at least about 95%, or essentially the entire exterior surface of the abrasive particles. In still other non-limiting embodiments, the coating may overly not greater than about 99% of the exterior surface area of the abrasive particle, such as, not greater than about 95%, not greater than about 90%, not greater than about 80%, not greater than about 70% or even not greater than about 60% of the exterior surface of the abrasive particles. It will be appreciated that the coating may overly any percent of the abrasive particle between any of the minimum and maximum values noted above. It will be further appreciated that the coating may overly any percent of the abrasive particle within a range between any of the minimum and maximum values noted above.

In further reference to the abrasive particles, the morphology of the abrasive particles may be described by an aspect ratio, which is a ratio between the dimensions of length to width. It will be appreciated that the length is the longest dimension of the abrasive particle and the width is the second longest dimension of a given abrasive particle. In accordance with embodiments herein, the abrasive particles may have an aspect ratio (length:width) of not greater than about 2:1 or even not greater than about 1.5:1. In particular instances, the abrasive particles may be essentially equiaxed, such that they have an aspect ratio of approximately 1:1.

According to yet other embodiments, the body of the abrasive article may include a particular content of the bond component. For example, the body of the abrasive article may include a bond component content of at least about 55 vol. % for a total volume of the body of the abrasive article, such as, at least about 58 vol. % or at least about 60 vol. % or at least about 63 vol. % or at least about 65 vol. % or at least about 68 vol. % or at least about 70 vol. % or at least about 73 vol. % or at least about 75 vol. % or at least about 78 vol. % or at least about 80 vol. % or at least about 83 vol. % or at least about 85 vol. % or at least about 88 vol. % or even at least about 90 vol. %. According to still another embodiment, the body of the abrasive article may include a bond component content of not greater than about 95 vol. %, such as, not greater than about 92 vol. % or not greater than about 90 vol. % or not greater than about 87 vol. % or not greater than about 85 vol. % or not greater than about 82 vol. % or not greater than about 80 vol. % or not greater than about 77 vol. % or not greater than about 75 vol. % or not greater than about 72 vol. % or not greater than about 70 vol. % or not greater than about 67 vol. % or even not greater than about 65 vol. %. It will be appreciated that the body of the abrasive article may include a bond component content of any value between any of the minimum and maximum values noted above. It will be further appreciated that the body of the abrasive article may include a bond component content of any value within a range between any of the minimum and maximum values noted above.

According to yet other embodiments, the bond component may include a particular content of the bond material. For example, the bond component may include a bond material content of at least about 60 vol. % for a total volume of the bond component, such as, at least about 63 vol. % or at least about 63 vol. % or at least about 68 vol. % or at least about 70 vol. % or at least about 73 vol. % or at least about 75 vol. % or at least about 78 vol. % or at least about 80 vol. % or at least about 83 vol. % or at least about 85 vol. % or at least about 88 vol. % or even at least about 90 vol. %. According to still another embodiment, the bond component may include a bond material content of not greater than about 94 vol. %, such as, not greater than about 92 vol. % or not greater than about 90 vol. % or not greater than about 87 vol. % or not greater than about 85 vol. % or not greater than about 82 vol. % or not greater than about 80 vol. % or not greater than about 77 vol. % or not greater than about 75 vol.

% or not greater than about 72 vol. % or not greater than about 70 vol. % or not greater than about 67 vol. % or even not greater than about 65 vol. %. It will be appreciated that the bond component may include a bond material content of any value between any of the minimum and maximum values noted above. It will be further appreciated that the bond component may include a bond material content of any value within a range between any of the minimum and maximum values noted above.

According to still other embodiments, the bond material may include an Fe—Co—Cu—Ni—Sn based bond material. The Fe—Co—Cu—Ni—Sn based bond material may be defined as a bond material having a total content of iron (Fe), cobalt (Co), copper (Cu), nickel (Ni) and tin (Sn) that accounts for a majority of the total volume of the bond material, such as, at least about 50 vol. % for a total volume of the bond material.

According to still other embodiments, the bond component may include a particular content of iron (Fe). For example, the bond component may include an iron (Fe) content of at least about 30 vol. % for a total volume of the bond component, such as, at least about 35 vol. % or at least about 38 vol. % or at least about 40 vol. % or at least about 43 vol. % or at least about 45 vol. % or at least about 48 vol. % or even at least about 50 vol. %. According to yet other embodiments, the bond component may include an iron (Fe) content of not greater than about 70 vol. % for a total volume of the bond component, such as, not greater than about 67 vol. % or not greater than about 65 vol. % or not greater than about 62 vol. % or not greater than about 60 vol. % or not greater than about 57 vol. % or even not greater than about 55 vol. %. It will be appreciated that the bond component may include an iron (Fe) content of any value between any of the minimum and maximum values noted above. It will be further appreciated that the bond component may include an iron (Fe) content of any value within a range between any of the minimum and maximum values noted above.

According to still other embodiments, the Fe—Co—Cu—Ni—Sn based bond material in the bond component may include a particular content of iron (Fe). For example, the Fe—Co—Cu—Ni—Sn based bond material may include an iron (Fe) content of at least about 30 vol. % for a total volume of the Fe—Co—Cu—Ni—Sn based bond material, such as, at least about 35 vol. % or at least about 38 vol. % or at least about 40 vol. % or at least about 43 vol. % or at least about 45 vol. % or at least about 48 vol. % or even at least about 50 vol. %. According to yet other embodiments, the Fe—Co—Cu—Ni—Sn based bond material in the bond component may include an iron (Fe) content of not greater than about 70 vol. % for a total volume of the Fe—Co—Cu—Ni—Sn based bond material, such as, not greater than about 67 vol. % or not greater than about 65 vol. % or not greater than about 62 vol. % or not greater than about 60 vol. % or not greater than about 57 vol. % or even not greater than about 55 vol. %. It will be appreciated that the Fe—Co—Cu—Ni—Sn based bond material in the bond component may include an iron (Fe) content of any value between any of the minimum and maximum values noted above. It will be further appreciated that the Fe—Co—Cu—Ni—Sn based bond material in the bond component may include an iron (Fe) content of any value within a range between any of the minimum and maximum values noted above.

According to still other embodiments, the bond component may include a particular content of cobalt (Co). For example, the bond component may include a cobalt (Co) content of at least about 5 vol. % for a total volume of the bond component, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the bond component may include a cobalt (Co) content of not greater than about 25 vol. % for a total volume of the bond component, such as, not greater than about 24 vol. % or not greater than about 23 vol. % or not greater than about 22 vol. % or not greater than about 21 vol. % or not greater than about 20 vol. % or even not greater than about 19 vol. %. It will be appreciated that the bond component may include a cobalt (Co) content of any value between any of the minimum and maximum values noted above. It will be further appreciated that the bond component may include a cobalt (Co) content of any value within a range between any of the minimum and maximum values noted above.

According to still other embodiments, the Fe—Co—Cu—Ni—Sn based bond material in the bond component may include a particular content of cobalt (Co). For example, the Fe—Co—Cu—Ni—Sn based bond material may include a cobalt (Co) content of at least about 5 vol. % for a total volume of the bond component, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the Fe—Co—Cu—Ni—Sn based bond material in the bond component may include a cobalt (Co) content of not greater than about 25 vol. % for a total volume of the bond component, such as, not greater than about 24 vol. % or not greater than about 23 vol. % or not greater than about 22 vol. % or not greater than about 21 vol. % or not greater than about 20 vol. % or even not greater than about 19 vol. %. It will be appreciated that the Fe—Co—Cu—Ni—Sn based bond material in the bond component may include a cobalt (Co) content of any value between any of the minimum and maximum values noted above. It will be further appreciated that the Fe—Co—Cu—Ni—Sn based bond material in the bond component may include a cobalt (Co) content of any value within a range between any of the minimum and maximum values noted above.

According to still other embodiments, the bond component may include a particular content of copper (Cu). For example, the bond component may include a copper (Cu) content of at least about 20 vol. % for a total volume of the bond component, such as, at least about 21 vol. % or at least about 22 vol. % or at least about 23 vol. % or at least about 24 vol. % or at least about 25 vol. % or at least about 26 vol. % or at least about 27 vol. % or at least about 28 vol. % or at least about 29 vol. % or even at least about 30 vol. %. According to yet other embodiments, the bond component may include a copper (Cu) content of not greater than about 50 vol. % for a total volume of the bond component, such as, not greater than about 49 vol. % or not greater than about 48 vol. % or not greater than about 47 vol. % or not greater than about 46 vol. % or not greater than about 45 vol. % or not greater than about 44 vol. % or not greater than about 43 vol. % or not greater than about 42 vol. % or not greater than about 41 vol. % or even not greater than about 40 vol. %. It will be appreciated that the bond component may include a copper (Cu) content of any value between any of the minimum and maximum values noted above. It will be further appreciated that the bond component may include a copper (Cu) content of any value within a range between any of the minimum and maximum values noted above.

According to still other embodiments, the Fe—Co—Cu—Ni—Sn based bond material in the bond component may include a particular content of copper (Cu). For example, the Fe—Co—Cu—Ni—Sn based bond material may include a copper (Cu) content of at least about 20 vol. % for a total volume of the bond component, such as, at least about 21 vol. % or at least about 22 vol. % or at least about 23 vol. % or at least about 24 vol. % or at least about 25 vol. % or at least about 26 vol. % or at least about 27 vol. % or at least about 28 vol. % or at least about 29 vol. % or even at least about 30 vol. %. According to yet other embodiments, the Fe—Co—Cu—Ni—Sn based bond material in the bond component may include a copper (Cu) content of not greater than about 50 vol. % for a total volume of the bond component, such as, not greater than about 49 vol. % or not greater than about 48 vol. % or not greater than about 47 vol. % or not greater than about 46 vol. % or not greater than about 45 vol. % or not greater than about 44 vol. % or not greater than about 43 vol. % or not greater than about 42 vol. % or not greater than about 41 vol. % or even not greater than about 40 vol. %. It will be appreciated that the Fe—Co—Cu—Ni—Sn based bond material in the bond component may include a copper (Cu) content of any value between any of the minimum and maximum values noted above. It will be further appreciated that the Fe—Co—Cu—Ni—Sn based bond material in the bond component may include a copper (Cu) content of any value within a range between any of the minimum and maximum values noted above.

According to still other embodiments, the bond component may include a particular content of nickel (Ni). For example, the bond component may include a nickel (Ni) content of at least about 5 vol. % for a total volume of the bond component, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the bond component may include a nickel (Ni) content of not greater than about 30 vol. % for a total volume of the bond component, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the bond component may include a nickel (Ni) content of any value between any of the minimum and maximum values noted above. It will be further appreciated that the bond component may include a nickel (Ni) content of any value within a range between any of the minimum and maximum values noted above.

According to still other embodiments, the Fe—Co—Cu—Ni—Sn based bond material in the bond component may include a particular content of nickel (Ni). For example, the Fe—Co—Cu—Ni—Sn based bond material may include a nickel (Ni) content of at least about 5 vol. % for a total volume of the bond component, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the Fe—Co—Cu—Ni—Sn based bond material in the bond component may include a nickel (Ni) content of not greater than about 30 vol. % for a total volume of the bond component, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the Fe—Co—Cu—Ni—Sn based bond material in the bond component may include a nickel (Ni) content of any value between any of the minimum and maximum values noted above. It will be further appreciated that the Fe—Co—Cu—Ni—Sn based bond material in the bond component may include a nickel (Ni) content of any value within a range between any of the minimum and maximum values noted above.

According to still other embodiments, the bond component may include a particular content of tin (Sn). For example, the bond component may include a tin (Sn) content of at least about 5 vol. % for a total volume of the bond component, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the bond component may include a tin (Sn) content of not greater than about 30 vol. % for a total volume of the bond component, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the bond component may include a tin (Sn) content of any value between any of the minimum and maximum values noted above. It will be further appreciated that the bond component may include a tin (Sn) content of any value within a range between any of the minimum and maximum values noted above.

According to still other embodiments, the Fe—Co—Cu—Ni—Sn based bond material in the bond component may include a particular content of tin (Sn). For example, the Fe—Co—Cu—Ni—Sn based bond material may include a tin (Sn) content of at least about 5 vol. % for a total volume of the bond component, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the Fe—Co—Cu—Ni—Sn based bond material in the bond component may include a tin (Sn) content of not greater than about 30 vol. % for a total volume of the bond component, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the Fe—Co—Cu—Ni—Sn based bond material in the bond component may include a tin (Sn) content of any value between any of the minimum and maximum values noted above. It will be further appreciated that the Fe—Co—Cu—Ni—Sn based bond material in the bond component may include a tin (Sn) content of any value within a range between any of the minimum and maximum values noted above.

According to yet other embodiments, the bond component may include a particular content of the performance enhancing component. For example, the bond component may include an performance enhancing component content of at least about 6 vol. % for a total volume of the bond forming mixture, such as, at least about 6.25 vol. % or at least about 6.5 vol. % or at least about 6.75 vol. % or at least about 7.0 vol. % or at least about 7.25 vol. % or at least about 7.5 vol. % or at least about 7.75 vol. % or even at least about 8.0 vol. %. According to still another embodiment, the bond component may include an performance enhancing component content of not greater than about 14 vol. %, such as, not greater than about 13.75 vol. % or not greater than about 13.5 vol. % or not greater than about 13.25 vol. % or not greater than about 13.0 vol. % or not greater than about 12.75 vol. % or not greater than about 12.5 vol. % or not greater than about 12.25 vol. % or even not greater than about 12.0 vol. %. It will be appreciated that the bond component may include a performance enhancing component content of any value between any of the minimum and maximum values noted above. It will be further appreciated that the bond component may include an performance enhancing component content of any value within a range between any of the minimum and maximum values noted above.

According to still other embodiments, the performance enhancing component may have a particular average particle size. For example, the performance enhancing component may have an average particle size of at least about 10 microns, such as, at least about 10.1 microns or at least about 10.2 microns or at least about 10.3 microns or at least about 10.4 microns or at least about 10.5 microns or at least about 10.6 microns or at least about 10.7 microns or at least about 10.8 microns or at least about 10.9 microns or even at least about 11.0 microns. According to still other embodiments microns or not greater than about the performance enhancing component may have an average particle size of not greater than about 12 microns, such as, not greater than about 11.9 microns or not greater than about 11.8 microns or not greater than about 11.7 microns or not greater than about 11.6 microns or not greater than about 11.5 microns or not greater than about 11.4 microns or not greater than about 11.3 microns or not greater than about 11.2 or even not greater than about 11.1 microns. It will be appreciated that the performance enhancing component may have an average particle size of any value between any of the minimum and maximum values noted above. It will be further appreciated that the performance enhancing component may have an average particle size of any value within a range between any of the minimum and maximum values noted above.

According to sill other embodiments, the performance enhancing component may include particles having a particular shape. For example, the particles of the performance enhancing component may have a spherical shape. According to still other embodiments, the particles of the performance enhancing component may have an agglomerate shape. According to still other embodiments, the particles of the performance enhancing component may have an irregular shape. According to still other embodiments, the particles of the performance enhancing component may have a platelet shape. According to still other embodiments, the particles of the performance enhancing component may have a dendritic shape. According to still other embodiments, the particles of the performance enhancing component may have a rod like shape.

According to still other embodiments, the body may include a particular content of porosity, which may be present through the entire volume of the body of the abrasive article. According to certain embodiments, the porosity may be open porosity. According to still other embodiments, the porosity may be closed porosity. According to yet other embodiments, the porosity may be a combination of open porosity and closed porosity. In particular embodiments, the, the body can have a porosity of at least about 2 vol. % for the total volume of the body, such as, at least about 3 vol. % or at least about 4 vol. % or at least about 5 vol. % or at least about 6 vol. % or at least about 7 vol. % or even at least about 8 vol. %. According to still other embodiments, the boy can have a porosity of not greater than about 20 vol. % porosity for a total volume of the body, such as, not greater than about 19 vol. % or not greater than about 18 vol. % or not greater than about 17 vol. % or not greater than about 16 vol. % or not greater than about 15 vol. % or not greater than about 14 vol. % or not greater than about 13 vol. % or even not greater than about 12 vol. %. It will be appreciated that the body may include a porosity of any value between any of the minimum and maximum values noted above. It will be further appreciated that the body may include a porosity of any value within a range between any of the minimum and maximum values noted above.

According to still other embodiments, the body may have a particular HRB hardness as measured according to ASTM E18-16. For example, the body may have a hardness of at least about 50 HRB, such as, at least about 52 HRB or at least about 55 HRB or at least about 58 HRB or at least about 60 HRB or at least about 63 HRB or even at least about 65 HRB. Accordingly to still other embodiments, the body may have a hardness of not greater than about 85 HRB, such as, not greater than about 82 HRB or not greater than about 80 HRB or not greater than about 78 HRB or not greater than about 75 HRB or not greater than about 73 HRB or even not greater than about 70 HRB. It will be appreciated that the body may have a hardness of any value between any of the minimum and maximum values noted above. It will be further appreciated that the body may have a hardness of any value within a range between any of the minimum and maximum values noted above.

According to yet another embodiment, the body may include phase material portion having specific phases. For example, the phase material portion of the body may include a bond material phase and a performance enhancing material phase dispersed within the bond material phase. According to certain embodiments, the bond material phase may be a continuous phase. For purposes of embodiments described herein, a continuous phase may be defined as defined regions of the phase material distributed throughout the body and interconnected to at least one other region of the same phase material. According to certain other embodiments, the performance enhancing material phase may be a discontinuous phase. For purposes of embodiments described herein, a discontinuous phase may be defined as defined regions of the phase material distributed throughout the body and are not connected to each other.

According to yet other embodiments, the body of the abrasive article may include a particular content of the phase material portion. For example, the body of the abrasive article may include a phase material portion content of at least about 55 vol. % for a total volume of the abrasive article forming mixture, such as, at least about 58 vol. % or at least about 60 vol. % or at least about 63 vol. % or at least about 65 vol. % or at least about 68 vol. % or at least about 70 vol. % or at least about 73 vol. % or at least about 75 vol. % or at least about 78 vol. % or at least about 80 vol. % or at least about 83 vol. % or at least about 85 vol. % or at least about 88 vol. % or even at least about 90 vol. %. According to still another embodiment, the body of the abrasive article may include a phase material portion content of not greater than about 95 vol. %, such as, not greater than about 92 vol. % or not greater than about 90 vol. % or not greater than about 87 vol. % or not greater than about 85 vol. % or not greater than about 82 vol. % or not greater than about 80 vol.

% or not greater than about 77 vol. % or not greater than about 75 vol. % or not greater than about 72 vol. % or not greater than about 70 vol. % or not greater than about 67 vol. % or even not greater than about 65 vol. %. It will be appreciated that the body of the abrasive article may include a phase material portion content of any value between any of the minimum and maximum values noted above. It will be further appreciated that the body of the abrasive article may include a phase material portion content of any value within a range between any of the minimum and maximum values noted above.

According to yet other embodiments, the phase material portion may include a particular content of the bond material phase. For example, the phase material portion may include a bond material phase content of at least about 60 vol. % for a total volume of the phase material portion, such as, at least about 63 vol. % or at least about 63 vol. % or at least about 68 vol. % or at least about 70 vol. % or at least about 73 vol. % or at least about 75 vol. % or at least about 78 vol. % or at least about 80 vol. % or at least about 83 vol. % or at least about 85 vol. % or at least about 88 vol. % or even at least about 90 vol. %. According to still another embodiment, the phase material portion may include a bond material phase content of not greater than about 94 vol. %, such as, not greater than about 92 vol. % or not greater than about 90 vol. % or not greater than about 87 vol. % or not greater than about 85 vol. % or not greater than about 82 vol. % or not greater than about 80 vol. % or not greater than about 77 vol. % or not greater than about 75 vol. % or not greater than about 72 vol. % or not greater than about 70 vol. % or not greater than about 67 vol. % or even not greater than about 65 vol. %. It will be appreciated that the phase material portion may include a bond material phase content of any value between any of the minimum and maximum values noted above. It will be further appreciated that the phase material portion may include a bond material phase content of any value within a range between any of the minimum and maximum values noted above.

According to still other embodiments, the bond material phase may include an Fe—Co—Cu—Ni—Sn based bond material. The Fe—Co—Cu—Ni—Sn based bond material may be defined as a bond material phase having a total content of iron (Fe), cobalt (Co), copper (Cu), nickel (Ni) and tin (Sn) that accounts for a majority of the total volume of the bond material phase, such as, at least about 50 vol. % for a total volume of the bond material.

According to still other embodiments, the bond material phase may include a particular content of iron (Fe). For example, the bond material phase may include an iron (Fe) content of at least about 30 vol. % for a total volume of the bond material phase, such as, at least about 35 vol. % or at least about 38 vol. % or at least about 40 vol. % or at least about 43 vol. % or at least about 45 vol. % or at least about 48 vol. % or even at least about 50 vol. %. According to yet other embodiments, the bond material phase may include an iron (Fe) content of not greater than about 70 vol. % for a total volume of the bond material phase, such as, not greater than about 67 vol. % or not greater than about 65 vol. % or not greater than about 62 vol. % or not greater than about 60 vol. % or not greater than about 57 vol. % or even not greater than about 55 vol. %. It will be appreciated that the bond material phase may include an iron (Fe) content of any value between any of the minimum and maximum values noted above. It will be further appreciated that the bond material phase may include an iron (Fe) content of any value within a range between any of the minimum and maximum values noted above.

According to still other embodiments, the Fe—Co—Cu—Ni—Sn based bond material in the bond material phase may include a particular content of iron (Fe). For example, the Fe—Co—Cu—Ni—Sn based bond material may include an iron (Fe) content of at least about 30 vol. % for a total volume of the Fe—Co—Cu—Ni—Sn based bond material, such as, at least about 35 vol. % or at least about 38 vol. % or at least about 40 vol. % or at least about 43 vol. % or at least about 45 vol. % or at least about 48 vol. % or even at least about 50 vol. %. According to yet other embodiments, the Fe—Co—Cu—Ni—Sn based bond material in the bond material phase may include an iron (Fe) content of not greater than about 70 vol. % for a total volume of the Fe—Co—Cu—Ni—Sn based bond material, such as, not greater than about 67 vol. % or not greater than about 65 vol. % or not greater than about 62 vol. % or not greater than about 60 vol. % or not greater than about 57 vol. % or even not greater than about 55 vol. %. It will be appreciated that the Fe—Co—Cu—Ni—Sn based bond material in the bond material phase may include an iron (Fe) content of any value between any of the minimum and maximum values noted above. It will be further appreciated that the Fe—Co—Cu—Ni—Sn based bond material in the bond material phase may include an iron (Fe) content of any value within a range between any of the minimum and maximum values noted above.

According to still other embodiments, the bond material phase may include a particular content of cobalt (Co). For example, the bond material phase may include a cobalt (Co) content of at least about 5 vol. % for a total volume of the bond material phase, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the bond material phase may include a cobalt (Co) content of not greater than about 25 vol. % for a total volume of the bond material phase, such as, not greater than about 24 vol. % or not greater than about 23 vol. % or not greater than about 22 vol. % or not greater than about 21 vol. % or not greater than about 20 vol. % or even not greater than about 19 vol. %. It will be appreciated that the bond material phase may include a cobalt (Co) content of any value between any of the minimum and maximum values noted above. It will be further appreciated that the bond material phase may include a cobalt (Co) content of any value within a range between any of the minimum and maximum values noted above.

According to still other embodiments, the Fe—Co—Cu—Ni—Sn based bond material in the bond material phase may include a particular content of cobalt (Co). For example, the Fe—Co—Cu—Ni—Sn based bond material may include a cobalt (Co) content of at least about 5 vol. % for a total volume of the bond material phase, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the Fe—Co—Cu—Ni—Sn based bond material in the bond material phase may include a cobalt (Co) content of not greater than about 25 vol. % for a total volume of the bond material phase, such as, not greater than about 24 vol. % or not greater than about 23 vol. % or not greater than about 22 vol. % or not greater than about 21 vol. % or not greater than about 20 vol. % or even not greater than about 19 vol. %. It will be appreciated that the Fe—Co—Cu—Ni—Sn based bond material in the bond material phase may include a cobalt (Co) content of any value between any of the minimum and maximum values noted above. It will be further appreciated that the Fe—Co—Cu—Ni—Sn based bond material in the bond material phase may include a cobalt (Co) content of any value within a range between any of the minimum and maximum values noted above.

According to still other embodiments, the bond material phase may include a particular content of copper (Cu). For example, the bond material phase may include a copper (Cu) content of at least about 20 vol. % for a total volume of the bond material phase, such as, at least about 21 vol. % or at least about 22 vol. % or at least about 23 vol. % or at least about 24 vol. % or at least about 25 vol. % or at least about 26 vol. % or at least about 27 vol. % or at least about 28 vol. % or at least about 29 vol. % or even at least about 30 vol. %. According to yet other embodiments, the bond material phase may include a copper (Cu) content of not greater than about 50 vol. % for a total volume of the bond material phase, such as, not greater than about 49 vol. % or not greater than about 48 vol. % or not greater than about 47 vol. % or not greater than about 46 vol. % or not greater than about 45 vol. % or not greater than about 44 vol. % or not greater than about 43 vol. % or not greater than about 42 vol. % or not greater than about 41 vol. % or even not greater than about 40 vol. %. It will be appreciated that the bond material phase may include a copper (Cu) content of any value between any of the minimum and maximum values noted above. It will be further appreciated that the bond material phase may include a copper (Cu) content of any value within a range between any of the minimum and maximum values noted above.

According to still other embodiments, the Fe—Co—Cu—Ni—Sn based bond material in the bond material phase may include a particular content of copper (Cu). For example, the Fe—Co—Cu—Ni—Sn based bond material may include a copper (Cu) content of at least about 20 vol. % for a total volume of the bond material phase, such as, at least about 21 vol. % or at least about 22 vol. % or at least about 23 vol. % or at least about 24 vol. % or at least about 25 vol. % or at least about 26 vol. % or at least about 27 vol. % or at least about 28 vol. % or at least about 29 vol. % or even at least about 30 vol. %. According to yet other embodiments, the Fe—Co—Cu—Ni—Sn based bond material in the bond material phase may include a copper (Cu) content of not greater than about 50 vol. % for a total volume of the bond material phase, such as, not greater than about 49 vol. % or not greater than about 48 vol. % or not greater than about 47 vol. % or not greater than about 46 vol. % or not greater than about 45 vol. % or not greater than about 44 vol. % or not greater than about 43 vol. % or not greater than about 42 vol. % or not greater than about 41 vol. % or even not greater than about 40 vol. %. It will be appreciated that the Fe—Co—Cu—Ni—Sn based bond material in the bond material phase may include a copper (Cu) content of any value between any of the minimum and maximum values noted above. It will be further appreciated that the Fe—Co—Cu—Ni—Sn based bond material in the bond material phase may include a copper (Cu) content of any value within a range between any of the minimum and maximum values noted above.

According to still other embodiments, the bond material phase may include a particular content of nickel (Ni). For example, the bond material phase may include a nickel (Ni) content of at least about 5 vol. % for a total volume of the bond material phase, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the bond material phase may include a nickel (Ni) content of not greater than about 30 vol. % for a total volume of the bond material phase, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the bond material phase may include a nickel (Ni) content of any value between any of the minimum and maximum values noted above. It will be further appreciated that the bond material phase may include a nickel (Ni) content of any value within a range between any of the minimum and maximum values noted above.

According to still other embodiments, the Fe—Co—Cu—Ni—Sn based bond material in the bond material phase may include a particular content of nickel (Ni). For example, the Fe—Co—Cu—Ni—Sn based bond material may include a nickel (Ni) content of at least about 5 vol. % for a total volume of the bond material phase, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the Fe—Co—Cu—Ni—Sn based bond material in the bond material phase may include a nickel (Ni) content of not greater than about 30 vol. % for a total volume of the bond material phase, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the Fe—Co—Cu—Ni—Sn based bond material in the bond material phase may include a nickel (Ni) content of any value between any of the minimum and maximum values noted above. It will be further appreciated that the Fe—Co—Cu—Ni—Sn based bond material in the bond material phase may include a nickel (Ni) content of any value within a range between any of the minimum and maximum values noted above.

According to still other embodiments, the bond material phase may include a particular content of tin (Sn). For example, the bond material phase may include a tin (Sn) content of at least about 5 vol. % for a total volume of the bond material phase, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the bond material phase may include a tin (Sn) content of not greater than about 30 vol. % for a total volume of the bond material phase, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the bond material phase may include a tin (Sn) content of any value between any of the minimum and maximum values noted above. It will be further appreciated that the bond material phase may include a tin (Sn) content of any value within a range between any of the minimum and maximum values noted above.

According to still other embodiments, the Fe—Co—Cu—Ni—Sn based bond material in the bond material phase may include a particular content of tin (Sn). For example, the Fe—Co—Cu—Ni—Sn based bond material may include a tin (Sn) content of at least about 5 vol. % for a total volume of the bond material phase, such as, at least about 6 vol. % or at least about 7 vol. % or at least about 8 vol. % or at least about 9 vol. % or at least about 10 vol. % or at least about 11 vol. % or even at least about 12 vol. %. According to yet other embodiments, the Fe—Co—Cu—Ni—Sn based bond material in the bond material phase may include a tin (Sn) content of not greater than about 30 vol. % for a total volume of the bond material phase, such as, not greater than about 29 vol. % or not greater than about 28 vol. % or not greater than about 27 vol. % or not greater than about 26 vol. % or not greater than about 25 vol. % or not greater than about 24 vol. % or not greater than about 23 vol. % or not greater than about 22 vol. % or not greater than about 21 vol. % or not greater than about 20 vol. % or even not greater than about 19 vol. %. It will be appreciated that the Fe—Co—Cu—Ni—Sn based bond material in the bond material phase may include a tin (Sn) content of any value between any of the minimum and maximum values noted above. It will be further appreciated that the Fe—Co—Cu—Ni—Sn based bond material in the bond material phase may include a tin (Sn) content of any value within a range between any of the minimum and maximum values noted above.

According to yet other embodiments, the phase material portion may include a particular content of the performance enhancing material phase. For example, the phase material portion may include an performance enhancing material phase content of at least about 6 vol. % for a total volume of the phase material portion, such as, at least about 6.25 vol. % or at least about 6.5 vol. % or at least about 6.75 vol. % or at least about 7.0 vol. % or at least about 7.25 vol. % or at least about 7.5 vol. % or at least about 7.75 vol. % or even at least about 8.0 vol. %. According to still another embodiment, the phase material portion may include an performance enhancing material phase content of not greater than about 14 vol. %, such as, not greater than about 13.75 vol. % or not greater than about 13.5 vol. % or not greater than about 13.25 vol. % or not greater than about 13.0 vol. % or not greater than about 12.75 vol. % or not greater than about 12.5 vol. % or not greater than about 12.25 vol. % or even not greater than about 12.0 vol. %. It will be appreciated that the phase material portion may include an performance enhancing material phase content of any value between any of the minimum and maximum values noted above. It will be further appreciated that the phase material portion may include an performance enhancing material phase content of any value within a range between any of the minimum and maximum values noted above.

According to still other embodiments, the bond material phase may have a particular VHN hardness $H_{BMP}$ as measured according to ASTM E384. For example, the bond material phase may have a hardness of at least about 100 VHN, such as, at least about 102 VHN or at least about 105 VHN or at least about 107 VHN or at least about 110 VHN or at least about 112 VHN or at least about 115 VHN or at least about 117 VHN or even at least about 120 VHN. According to still other embodiments, the bond material phase may have a hardness of not greater than about 500 VHN, such as, not greater than about 490 VHN or not greater than about 480 VHN or not greater than about 475 VHN or not greater than about 470 VHN or not greater than about 465 VHN or not greater than about 460 VHN or not greater than about 455 VHN or even not greater than about 450 VHN. It will be appreciated that the hardness of the bond material phase may be any value between any of the minimum and maximum values noted above. It will be further appreciated that the hardness of the bond material phase may be any value within a range between any of the minimum and maximum values noted above.

According to still other embodiments, the performance enhancing material phase may have a particular VHN hardness $H_{PEMP}$ as measured according to ASTM E384. For example, the performance enhancing material phase may have a hardness of at least about 10 VHN, such as, at least about 12 VHN or at least about 15 VHN or at least about 17 VHN or at least about 20 VHN or at least about 22 VHN or at least about 25 VHN or at least about 27 VHN or even at least about 30 VHN. According to still other embodiments, the performance enhancing material phase may have a hardness of not greater than about 300 VHN, such as, not greater than about 290 VHN or not greater than about 280 VHN or not greater than about 270 VHN or not greater than about 260 VHN or not greater than about 250 VHN or not greater than about 240 VHN or not greater than about 230 VHN or not greater than about 220 VHN or not greater than about 210 VHN or even not greater than about 200 VHN. It will be appreciated that the hardness of performance enhancing material phase may be any value between any of the minimum and maximum values noted above. It will be further appreciated that the hardness of the performance enhancing material phase may be any value within a range between any of the minimum and maximum values noted above.

According to yet other embodiments, the hardness of the performance enhancing material phase $H_{PEMP}$ may be less than the hardness of the bond material phase $H_{BMP}$.

Many different aspects and embodiments are possible. Some of those aspects and embodiments are described below. After reading this specification, skilled artisans will appreciate that those aspects and embodiments are only illustrative and do not limit the scope of the present invention. Embodiments can be in accordance with any one or more of the items as listed below.

Embodiment 1

An abrasive article comprising a body, wherein the body comprises: a bond component; and abrasive particles within the bond component, wherein the bond component comprises a Fe—Co—Cu—Ni—Sn based bond material and a performance enhancing material, wherein the performance enhancing material comprises hexagonal boron nitride, and wherein a content of the performance enhancing material is at least about 6 vol. % and not greater than about 14 vol. % for a total volume of the bond component.

Embodiment 2

An abrasive article comprising a body, wherein the body comprises: a bond component; and abrasive particles within the bond component, wherein the bond component comprises a Fe—Co—Cu—Ni—Sn based bond material and a performance enhancing material, wherein the performance enhancing material comprises hexagonal boron nitride, and wherein the body comprises a hardness of at least about 50 HRB and not greater than about 85 HRB.

Embodiment 3

An abrasive article comprising a body, wherein the body comprises: a continuous bond material phase; abrasive particles within the continuous bond material phase; and a discontinuous performance enhancing material phase dispersed within the continuous bond material phase, wherein the bond material phase comprises an Fe—Co—Cu—Ni—Sn based bond material, and wherein a hardness of the performance enhancing material phase $H_{PEMP}$ is less than a hardness of the bond material phase $H_{BMP}$.

Embodiment 4

A method of forming an abrasive article, wherein the method comprises: providing an abrasive article forming mixture, and forming the abrasive article forming mixture into the abrasive article, wherein the abrasive article forming mixture comprises a bond forming mixture, and abrasive particles, wherein the bond forming mixture comprises a unprocessed bond material and a unprocessed performance enhancing material, wherein the unprocessed bond material comprises a Fe—Co—Cu—Ni—Sn based bond material, wherein the unprocessed performance enhancing material comprises hexagonal boron nitride, and wherein a content of the unprocessed performance enhancing material in the abrasive article forming mixture is at least about 6 vol. % and not greater than about 14 vol. % for a total volume of the bond forming mixture.

Embodiment 5

A method of forming an abrasive article, wherein the method comprises: providing an abrasive article forming mixture; and forming the mixture into the abrasive article, wherein the bond forming mixture comprises an unprocessed bond material and an unprocessed performance enhancing material, wherein the unprocessed bond material comprises a Fe—Co—Cu—Ni—Sn based bond material, wherein the unprocessed performance enhancing material comprises hexagonal boron nitride, and wherein the abrasive article comprising a body having a hardness of at least about 50 HRB and not greater than about 85 HRB.

Embodiment 6

A method of forming an abrasive article, wherein the method comprises: providing an abrasive article forming mixture; and forming the mixture into the abrasive article, wherein the abrasive article comprises: a continuous bond material phase; abrasive particles within the continuous bond material phase; and a discontinuous performance enhancing material phase dispersed within the continuous bond material phase, wherein the bond material phase comprises an Fe—Co—Cu—Ni—Sn based bond material, and wherein a hardness of the performance enhancing material phase $H_{PEMP}$ is less than a hardness of the bond material phase $H_{BMP}$.

Embodiment 7

The composite film or method of any one of embodiments 1, 2, 3, 4, 5, and 6, wherein the performance enhancing component consists of hexagonal boron nitride.

Embodiment 8

The method of any one of embodiments 4, 5, and 6, wherein the unprocessed performance enhancing component consists of hexagonal boron nitride.

Embodiment 9

The composite film or method of any one of embodiments 2, 3, 4, 5, and 6, wherein a content of the performance enhancing component in the abrasive article is at least about 6 vol. % and not greater than about 14 vol. % for a total volume of the abrasive article.

Embodiment 10

The method of any one of embodiments 4, 5, and 6, wherein a content of the unprocessed performance enhancing component in the abrasive article forming mixture is at least about 6 vol. % and not greater than about 14 vol. % for a total volume of the bond forming mixture.

Embodiment 11

The composite film or method of any one of embodiments 1, 2, 3, 4, 5, and 6, wherein the performance enhancing component has an average particle size of at least about 10 microns.

Embodiment 12

The method of any one of embodiments 4, 5, and 6, wherein the unprocessed performance enhancing component has an average particle size of at least about 10 microns.

Embodiment 13

The composite film or method of any one of embodiments 1, 2, 3, 4, 5, and 6, wherein the performance enhancing component has an average particle size of not greater than about 12 microns.

Embodiment 14

The method of any one of embodiments 4, 5, and 6, wherein the unprocessed performance enhancing component has an average particle size of not greater than about 12 microns.

Embodiment 15

The composite film or method of any one of embodiments 1, 2, 3, 4, 5, and 6, wherein the body has a hardness of at least about 50 HRB.

Embodiment 16

The composite film or method of any one of embodiments 1, 2, 3, 4, 5, and 6, wherein the body has a hardness of not greater than about 85 HRB.

Embodiment 17

The composite film or method of any one of embodiments 1, 2, 3, 4, 5, and 6, wherein the abrasive article comprises a bond component content of at least about 55 vol. % for a total volume of abrasive article.

Embodiment 18

The method of any one of embodiments 4, 5, and 6, wherein the abrasive article forming mixture comprises a bond forming mixture content of at least about 55 vol. % for a total volume of abrasive article forming mixture.

Embodiment 19

The composite film or method of any one of one embodiments 1, 2, 3, 4, 5, and 6, wherein the abrasive article comprises a bond component content of not greater than about 95 vol. % for a total volume of abrasive article.

Embodiment 20

The method of any one of embodiments 4, 5, and 6, wherein the abrasive article forming mixture comprises a bond forming mixture content of not greater than about 95 vol. % for a total volume of abrasive article forming mixture.

Embodiment 21

The composite film or method of any one of embodiments 1, 2, 3, 4, 5, and 6, wherein the abrasive article comprises an abrasive particle content of at least about 5 vol. % for a total volume of abrasive article.

Embodiment 22

The method of any one of embodiments 4, 5, and 6, wherein the abrasive article forming mixture comprises an abrasive particle content of at least about 5 vol. % for a total volume of abrasive article forming mixture.

Embodiment 23

The composite film or method of any one of embodiments 1, 2, 3, 4, 5, and 6, wherein the abrasive article comprises an abrasive particle content of not greater than about 25 vol. % for a total volume of abrasive article.

Embodiment 24

The method of any one of embodiments 4, 5, and 6, wherein the abrasive article forming mixture comprises an abrasive particle content of not greater than about 25 vol. % for a total volume of abrasive article forming mixture.

Embodiment 25

The composite film or method of any one of embodiments 1, 2, 3, 4, 5, and 6, wherein the abrasive article comprises porosity, wherein the porosity is interconnected porosity, wherein the porosity is closed porosity.

Embodiment 26

The composite film or method of any one of embodiments 1, 2, 3, 4, 5, and 6, wherein the abrasive article further comprises a porosity content of at least about 2 vol. % for a total volume of abrasive article.

Embodiment 27

The composite film or method of any one of embodiments 1, 2, 3, 4, 5, and 6, wherein the abrasive article further comprises a porosity content of not greater than about 20 vol. % for a total volume of abrasive article.

Embodiment 28

The composite film or method of any one of embodiments 1, 2, 3, 4, 5, and 6, wherein the bond component comprises an iron (Fe) content of at least about 30 vol. % for a total volume of the bond component.

Embodiment 29

The method of any one of embodiments 4, 5, and 6, wherein the bond forming mixture comprises an iron (Fe) content of at least about 30 vol. % for a total volume of the bond forming mixture.

Embodiment 30

The composite film or method of any one of embodiments 1, 2, 3, 4, 5, and 6, wherein the bond component comprises an iron (Fe) content of not greater than about 70 vol. % for a total volume of the bond component.

Embodiment 31

The method of any one of embodiments 4, 5, and 6, wherein the bond forming mixture comprises an iron (Fe) content of not greater than about 70 vol. % for a total volume of the bond component.

Embodiment 32

The composite film or method of any one of embodiments 1, 2, 3, 4, 5, and 6, wherein the Fe—Co—Cu—Ni—Sn based bond material comprises an Fe content of at least about 30 vol. % for a total volume of the Fe—Co—Cu—Ni—Sn based bond material.

Embodiment 33

The composite film or method of any one of embodiments 1, 2, 3, 4, 5, and 6, wherein the Fe—Co—Cu—Ni—Sn based bond material comprises an Fe content of at least about 70 vol. % for a total volume of the Fe—Co—Cu—Ni—Sn based bond material.

Embodiment 34

The composite film or method of any one of embodiments 1, 2, 3, 4, 5, and 6, wherein the bond component comprises an cobalt (Co) content of at least about 5 vol. % for a total volume of the bond component.

Embodiment 35

The method of any one of embodiments 4, 5, and 6, wherein the bond forming mixture comprises a cobalt (Co) content of at least about 5 vol. % for a total volume of the bond forming mixture.

Embodiment 36

The composite film or method of any one of embodiments 1, 2, 3, 4, 5, and 6, wherein the bond component comprises an cobalt (Co) content of not greater than about 25 vol. % for a total volume of the bond component.

Embodiment 37

The method of any one of embodiments 4, 5, and 6, wherein the bond forming mixture comprises an cobalt (Co) content of not greater than about 25 vol. % for a total volume of the forming mixture.

Embodiment 38

The composite film or method of any one of embodiments 1, 2, 3, 4, 5, and 6, wherein the Fe—Co—Cu—Ni—Sn based bond material comprises an Co content of at least about 5 vol. % for a total volume of the Fe—Co—Cu—Ni—Sn based bond material.

Embodiment 39

The composite film or method of any one of embodiments 1, 2, 3, 4, 5, and 6, wherein the Fe—Co—Cu—Ni—Sn based bond material comprises an Co content of at least about 25 vol. % for a total volume of the Fe—Co—Cu—Ni—Sn based bond material.

Embodiment 40

The composite film or method of any one of embodiments 1, 2, 3, 4, 5, and 6, wherein the bond component comprises a copper (Cu) content of at least about 20 vol. % for a total volume of the bond component.

Embodiment 41

The method of any one of embodiments 4, 5, and 6, wherein the bond forming mixture comprises a copper (Cu) content of at least about 20 vol. % for a total volume of the bond forming mixture.

Embodiment 42

The composite film or method of any one of embodiments 1, 2, 3, 4, 5, and 6, wherein the bond component comprises a copper (Cu) content of not greater than about 50 vol. % for a total volume of the bond component.

Embodiment 43

The method of any one of embodiments 4, 5, and 6, wherein the bond forming mixture comprises a copper (Cu) content of not greater than about 50 vol. % for a total volume of the bond forming mixture.

Embodiment 44

The composite film or method of any one of embodiments 1, 2, 3, 4, 5, and 6, wherein the Fe—Co—Cu—Ni—Sn based bond material comprises a copper (Cu) content of at least about 20 vol. % for a total volume of the Fe—Co—Cu—Ni—Sn based bond material.

Embodiment 45

The composite film or method of any one of embodiments 1, 2, 3, 4, 5, and 6, wherein the Fe—Co—Cu—Ni—Sn based bond material comprises a copper (Cu) content of at least about 50 vol. % for a total volume of the Fe—Co—Cu—Ni—Sn based bond material.

Embodiment 46

The composite film or method of any one of embodiments 1, 2, 3, 4, 5, and 6, wherein the bond component comprises a nickel (Ni) content of at least about 5 vol. % for a total volume of the bond component.

Embodiment 47

The method of any one of embodiments 4, 5, and 6, wherein the bond forming mixture comprises a nickel (Ni) content of at least about 5 vol. % for a total volume of the bond forming mixture.

Embodiment 48

The composite film or method of any one of embodiments 1, 2, 3, 4, 5, and 6, wherein the bond component comprises a nickel (Ni) content of not greater than about 30 vol. % for a total volume of the bond component.

Embodiment 49

The method of any one of embodiments 4, 5, and 6, wherein the bond forming mixture comprises a nickel (Ni) content of not greater than about 30 vol. % for a total volume of the bond forming mixture.

Embodiment 50

The composite film or method of any one of embodiments 1, 2, 3, 4, 5, and 6, wherein the Fe—Co—Cu—Ni—Sn based bond material comprises a nickel (Ni) content of at least about 5 vol. % for a total volume of the Fe—Co—Cu—Ni—Sn based bond material.

Embodiment 51

The composite film or method of any one of embodiments 1, 2, 3, 4, 5, and 6, wherein the Fe—Co—Cu—Ni—Sn based bond material comprises a nickel (Ni) content of at least about 30 vol. % for a total volume of the Fe—Co—Cu—Ni—Sn based bond material.

Embodiment 52

The composite film or method of any one of embodiments 1, 2, 3, 4, 5, and 6, wherein the bond component comprises a tin (Sn) content of at least about 2 vol. % for a total volume of the bond component.

Embodiment 53

The method of any one of embodiments 4, 5, and 6, wherein the bond forming mixture comprises a tin (Sn) content of at least about 2 vol. % for a total volume of the bond forming mixture.

Embodiment 54

The composite film or method of any one of embodiments 1, 2, 3, 4, 5, and 6, wherein the bond component comprises a tin (Sn) content of not greater than about 20 vol. % for a total volume of the bond component.

Embodiment 55

The method of any one of embodiments 4, 5, and 6, wherein the bond forming mixture comprises a tin (Sn) content of not greater than about 20 vol. % for a total volume of the bond forming mixture.

Embodiment 56

The composite film or method of any one of embodiments 1, 2, 3, 4, 5, and 6, wherein the Fe—Co—Cu—Ni—Sn based bond material comprises a tin (Sn) content of at least about 2 vol. % for a total volume of the Fe—Co—Cu—Ni—Sn based bond material.

Embodiment 57

The composite film or method of any one of embodiments 1, 2, 3, 4, 5, and 6, wherein the Fe—Co—Cu—Ni—Sn based bond material comprises a tin (Sn) content of at least about 20 vol. % for a total volume of the Fe—Co—Cu—Ni—Sn based bond material.

Embodiment 58

The composite film or method of any one of embodiments 1, 2, 3, 4, 5, and 6, wherein the abrasive particles comprise diamond, wherein the abrasive particles comprise cubic boron nitride (cBN), wherein the abrasive particles consists of diamond, wherein the abrasive particles consists of cubic boron nitride (cBN).

Embodiment 59

The composite film or method of any one of embodiments 1, 2, 3, 4, 5, and 6, wherein the abrasive particles have an average particle size of at least about 100 microns.

Embodiment 60

The composite film or method of any one of embodiments 1, 2, 3, 4, 5, and 6, wherein the abrasive particles have an average particle size of not greater than about 1000 microns.

EXAMPLES

Example 1

A sample abrasive article S1 were formed according to embodiments described herein and compared to a comparative sample abrasive article CS1. Sample abrasive article S1 and comparative sample abrasive article CS1 were formed from the abrasive article forming mixtures provided in Table 1 below.

TABLE 1

| Component | S1 | CS1 |
|---|---|---|
| Abrasive Article Forming Mixture Composition (Vol. % of Total Mixture Volume) | | |
| Abrasive Particles (Diamond) | 9 | 9 |
| Bond Component | 91 | 91 |

TABLE 1-continued

| Component | S1 | CS1 |
|---|---|---|
| Bond Component (Vol. % of Total Bond Component Volume) | | |
| h-BN (Performance Enhancing Component) | 10 | 0 |
| Fe (Vol. % of Total Metal Bond Component) | 41 | 46 |
| Co (Vol. % of Total Metal Bond Component) | 6 | 7 |
| Ni (Vol. % of Total Metal Bond Component) | 8 | 9 |
| Sn (Vol. % of Total Metal Bond Component) | 4 | 5 |
| Cu (Vol. % of Total Metal Bond Component) | 31 | 33 |

The mixtures described in Table 1 were formed into sample abrasive articles. All sample abrasive articles were tested to compare grinding performance by measuring the power draw of each article of each sample. The grinding test was conducted according to the parameters as provided in Table 2 below.

TABLE 2

| Grinding Test Parameters | |
|---|---|
| Machine | Vertical rotary surface grinder |
| Wheel Diameter: | 1100 mm |
| Peripheral Speed | 8 m/s |
| Grinding Speed | 0.3 mm/min feed |
| Refractory surface area | Up to 14000 $cm^2$ |
| Refractory Type | Alumina, Alumina Zirconia composite |
| Coolant Flow | Flood Coolant |

Figure 2:
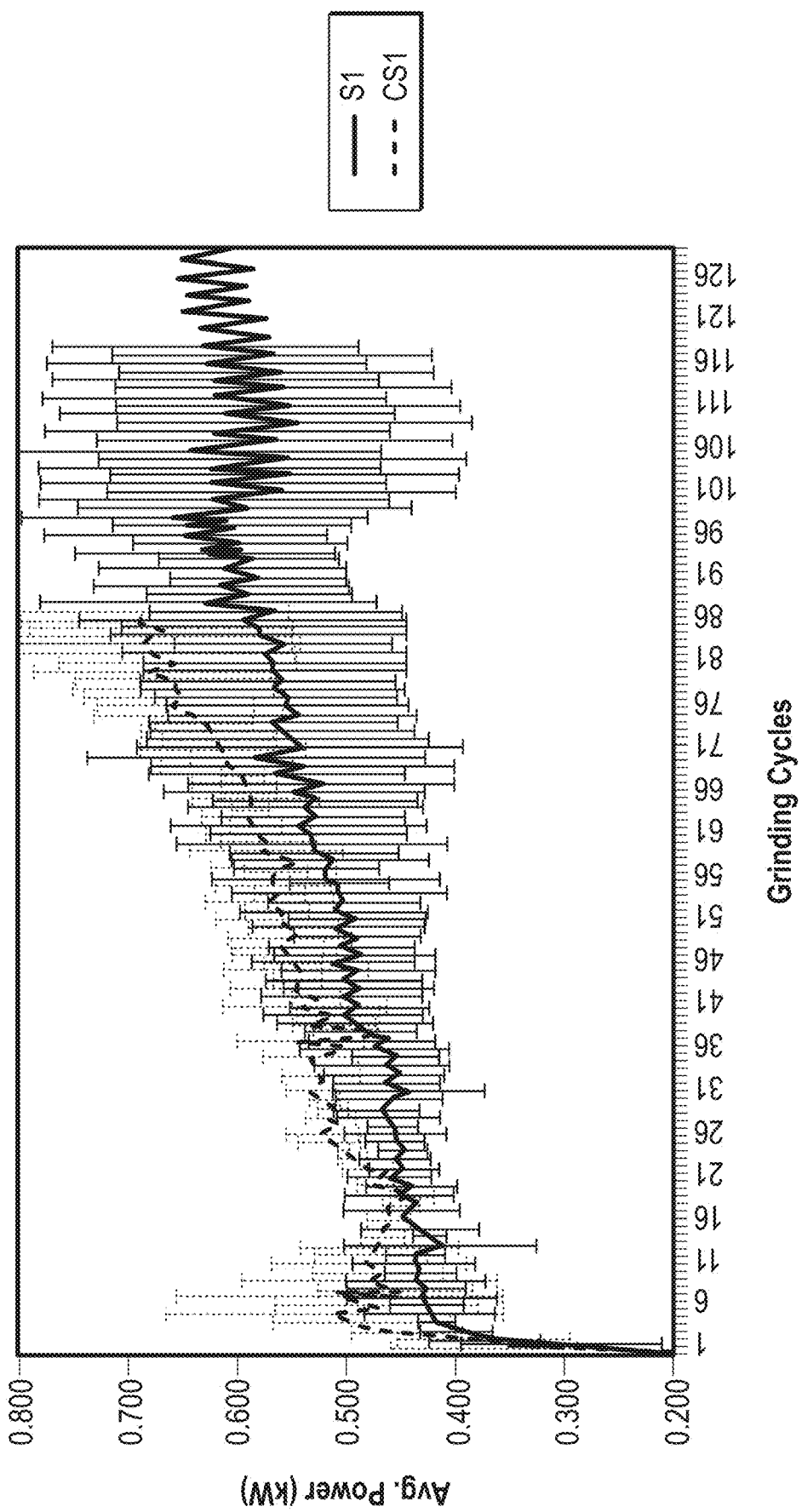
FIG. 2 includes a plot showing the performance of an abrasive article formed according to embodiments described herein as compared to the performance of a comparative sample abrasive article.

FIG. 2 is graph showing the average power drawn per grind cycle for each sample abrasive wheel. As shown in FIG. 2, when compared to comparative sample 1 (i.e., an abrasive wheel with no hBN added as a performance enhancing component), the sample abrasive articles S1 formed according to embodiments described herein, showed improved power draw.

Example 2

A sample abrasive article S2 were formed according to embodiments described herein and compared to comparative sample abrasive articles CS2 and CS3. Sample abrasive article S1 and comparative sample abrasive articles CS2 and CS3 were formed from the abrasive article forming mixtures provided in Table 3 below.

TABLE 3

| Component | S2 | CS2 | CS3 |
|---|---|---|---|
| Abrasive Article Forming Mixture Composition (Vol. % of Total Mixture Volume) | | | |
| Abrasive Particles (Diamond) | 9 | 9 | 9 |
| Bond Component | 91 | 91 | 91 |
| Bond Component (Vol. % of Total Bond Component Volume) | | | |
| h-BN (Performance Enhancing Component) | 5 | 10 | 15 |
| Fe (Vol. % of Total Metal Bond Component) | 43 | 41 | 38 |
| Co (Vol. % of Total | 6 | 6 | 6 |

TABLE 3-continued

| Component | S2 | CS2 | CS3 |
|---|---|---|---|
| Metal Bond Component) | | | |
| Ni (Vol. % of Total Metal Bond Component) | 9 | 8 | 8 |
| Sn (Vol. % of Total Metal Bond Component) | 4 | 4 | 4 |
| Cu (Vol. % of Total Metal Bond Component) | 33 | 31 | 29 |

The mixtures described in Table 3 were formed into sample abrasive articles. All sample abrasive articles were tested to compare grinding performance by measuring the average wear and average power draw of each sample. The grinding test was conducted according to the parameters as provided in Table 4 below.

TABLE 4

| Grinding Test Parameters | |
|---|---|
| Machine | CNC milling machine |
| Wheel Diameter: | 40 mm |
| Peripheral Speed | 5 m/s |
| Grinding Speed | 0.2 mm |
| Glass Surface Area | 500 mm$^2$ |
| Glass Type | AZS refractory |
| Coolant Flow | Pointed Flow |

Figure 3:
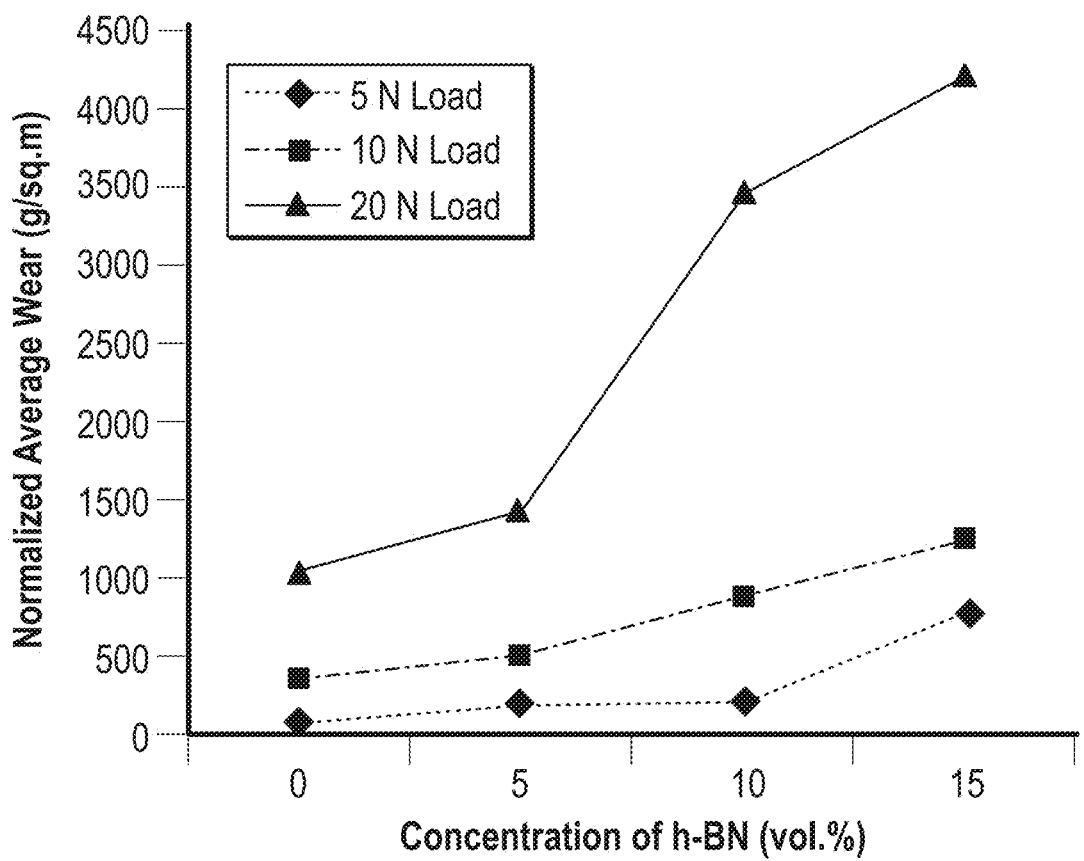
FIG. 3 includes a plot showing the performance of an abrasive article formed according to embodiments described herein as compared to the performance of comparative sample abrasive articles.

FIG. 3 is graph showing the normalized average wear for each sample abrasive wheel. As shown in FIG. 3, the average wear experienced by each abrasive article increases (i.e., the wheel life decreases) as to concentration of hBN increases.

Figure 4:
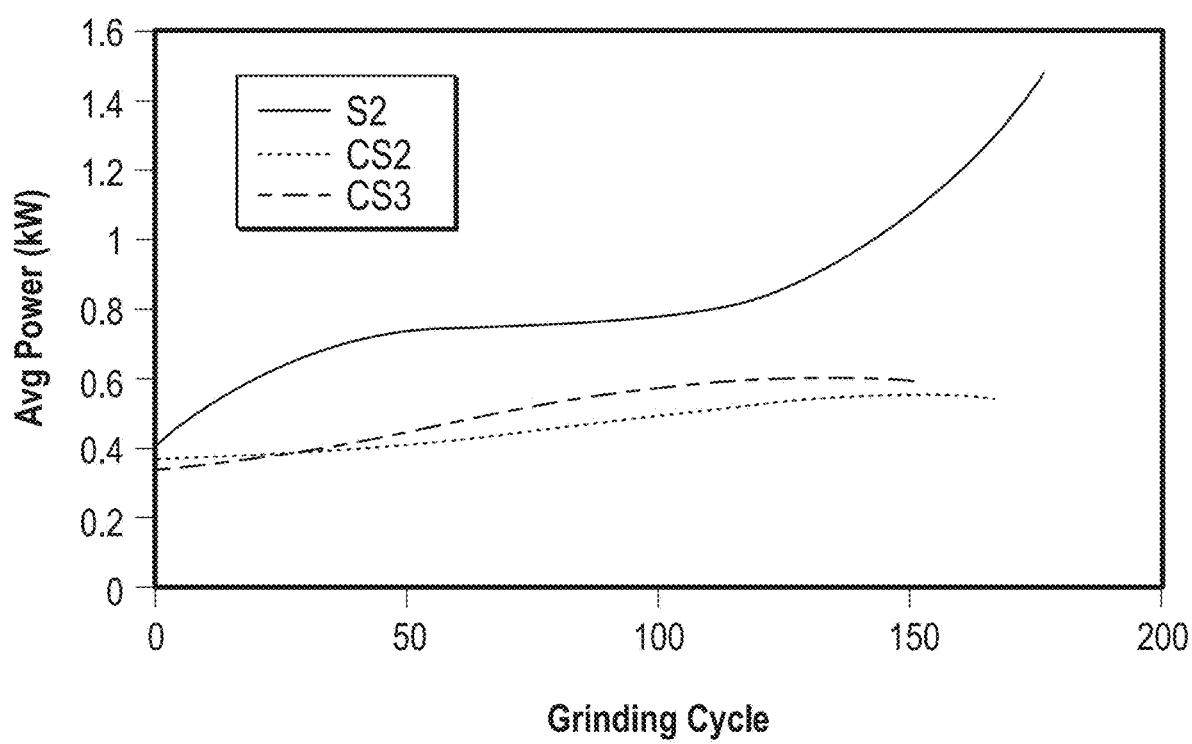
FIG. 4 includes a plot showing the performance of an abrasive article formed according to embodiments described herein as compared to the performance of comparative sample abrasive articles.

FIG. 4 is a graph showing the average power drawn over time for each sample abrasive wheel. As shown in FIG. 4, the average power drawn shown for each abrasive article decreases (i.e., wheel grinding performance improves) as to concentration of hBN increases.

Example 3

A sample S3 of the bond component formed according to embodiments described herein and compared to a comparative sample bond component CS4. Sample S3 and comparative sample CS4 were formed from the bond component mixtures provided in Table 5 below.

TABLE 5

| Bond Component (Vol. % of Total Bond Component Volume) | | |
|---|---|---|
| h-BN (Performance Enhancing Component) | 10 | 0 |
| Fe (Vol. % of Total Metal Bond Component) | 41 | 43 |
| Co (Vol. % of Total Metal Bond Component) | 6 | 7 |
| Ni (Vol. % of Total Metal Bond Component) | 8 | 9 |
| Sn (Vol. % of Total Metal Bond Component) | 4 | 5 |
| Cu (Vol. % of Total Metal Bond Component) | 31 | 33 |

Figure 5A:
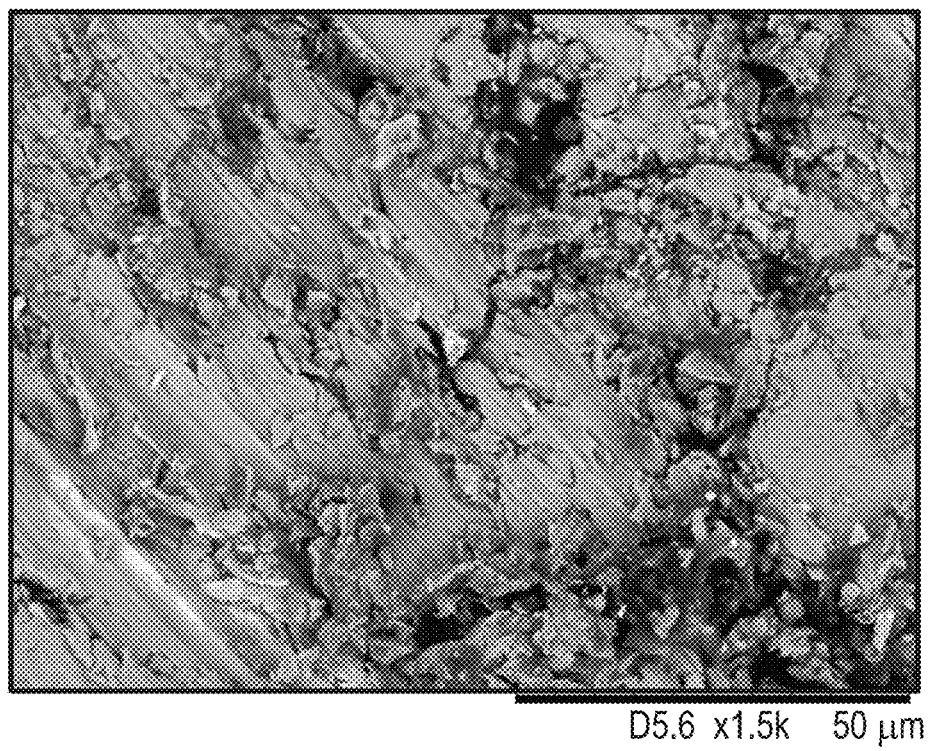
FIGS. 5a and 5b include images of the microstructure of an abrasive article formed according to embodiments described herein.
Figure 5B:
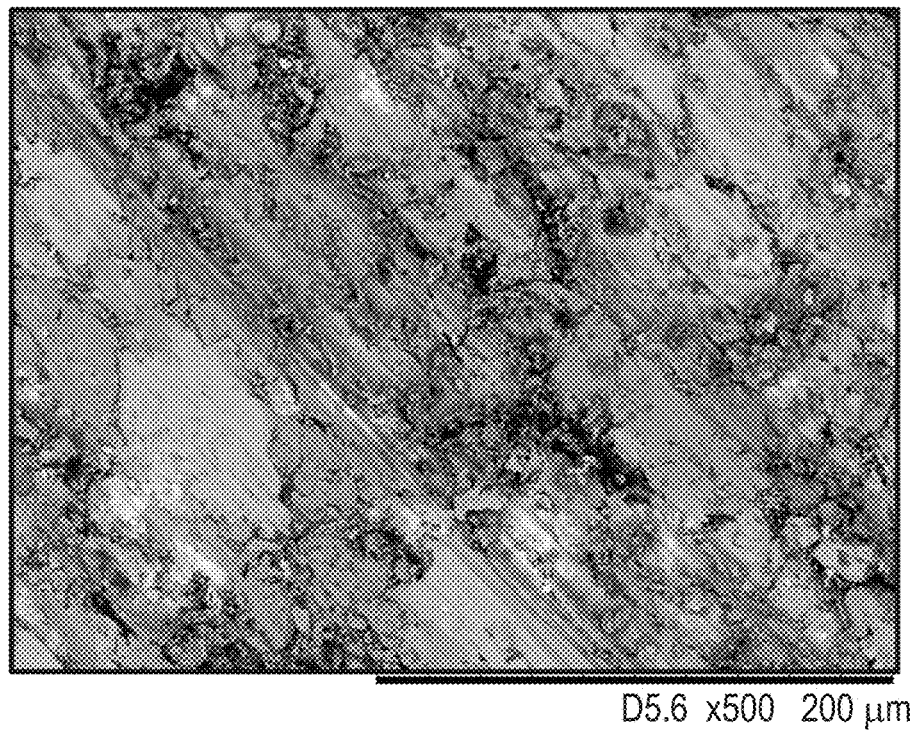
Figure 6A:
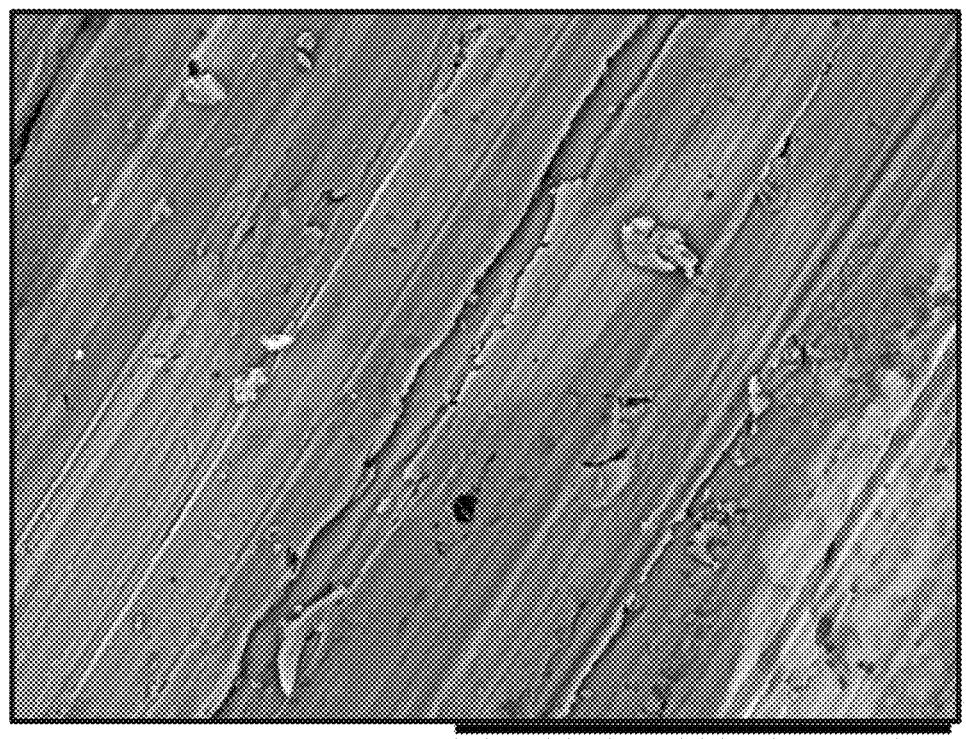
FIGS. 6a and 6b include images of the microstructure of a comparative abrasive article.
Figure 6B:
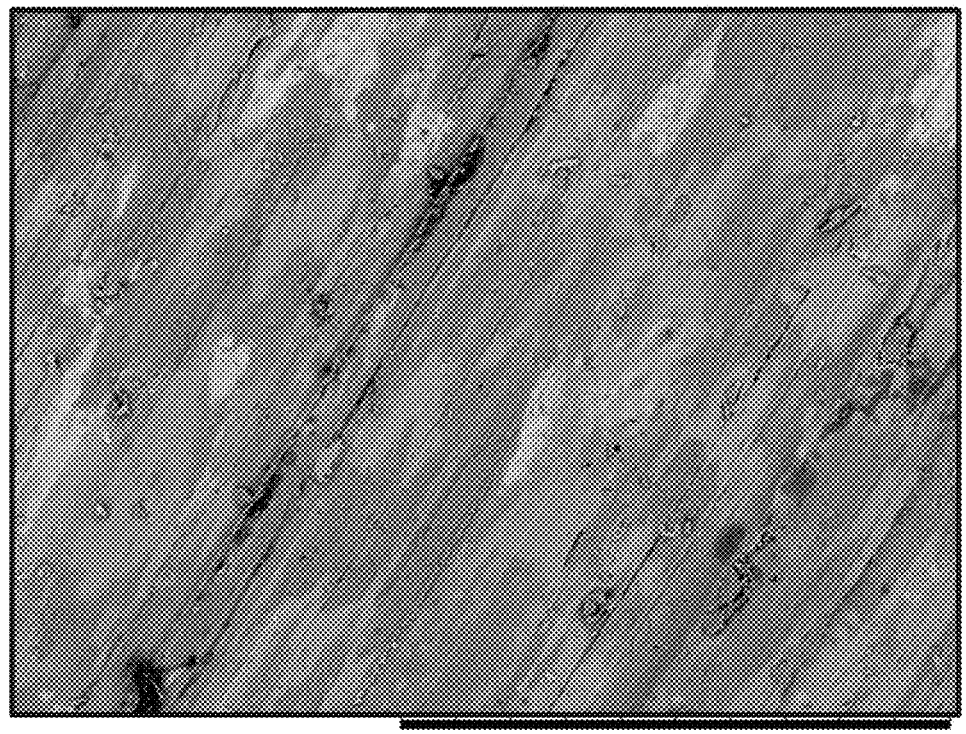

The mixtures described in Table 5 were formed into samples for evaluation. FIG. 5 includes multiple images of the microstructure of sample abrasive article S3. FIG. 6 includes multiple images of the microstructure of comparative sample abrasive article CS4. As shown in FIGS. 5 and 6, the addition of hBN creates a microstructure with multiple imperfections, discontinuities and ruptured sites. Without wishing to be tied to any particular theory, it is believed that the microstructure of sample abrasive article S3 shows that the presence of hBN causes the bond matrix to becoming more brittle and thus more wearable, which improves grinding performance.

The present application represents a departure from the state of the art. Notably, the embodiments herein demonstrate improved and unexpected performance over abrasive articles formed according to conventional methods. While not wishing to be bound to a particular theory, it is suggested that the combination of certain features including processes, materials, and the like may facilitate such improvements. The combination of features can include, but is not limited to, a composition that includes a particular concentration of hBN, which acts as a performance enhancing component of the abrasive article and balancing the hardness of the bond material phase in the abrasive article as compared to the hardness of the performance enhancing component phase of the abrasive article.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive article comprising a body, wherein the body comprises:
   a bond component; and
   abrasive particles within the bond component,
   wherein the bond component comprises a Fe—Co—Cu—Ni—Sn based bond material and a performance enhancing material,
   wherein a total content of Fe, Co, Cu, Ni and Sn accounts for at least about 50 vol. % for a total volume of the bond material,
   wherein the bond component comprises an Fe content of at least about 30 vol. % and not greater than about 70 vol. %, wherein the bond component comprises a Co content of at least about 5 vol. % and not greater than about 25 vol. %,
wherein the bond component comprises a Cu content of at least about 20 vol. % and not greater than about 50 vol. %,
wherein the bond component comprises a Ni content of at least about 5 vol. % and not greater than about 30 vol. %,
wherein the bond component comprises a Sn content of at least about 2 vol. % and not greater than about 20 vol. %,
wherein the performance enhancing material comprises hexagonal boron nitride, and
wherein a content of the performance enhancing material is at least about 6 vol. % and not greater than about 14 vol. % for a total volume of the bond component.

2. The composite film of claim 1, wherein the performance enhancing component consists of hexagonal boron nitride.

3. The composite film of claim 1, wherein the performance enhancing component has an average particle size of at least about 10 microns.

4. The composite film of claim 3, wherein the performance enhancing component has an average particle size of not greater than about 12 microns.

5. The composite film of claim 1, wherein the body has a hardness of at least about 50 HRB.

6. The composite film of claim 5, wherein the body has a hardness of not greater than about 85 HRB.

7. The composite film of claim 1, wherein the abrasive article comprises a bond component content of at least about 55 vol. % for a total volume of abrasive article.

8. The composite film of claim 7, wherein the abrasive article comprises a bond component content of not greater than about 95 vol. % for a total volume of abrasive article.

9. The composite film of claim 1, wherein the abrasive article comprises an abrasive particle content of at least about 5 vol. % for a total volume of abrasive article.

10. The composite film of claim 9, wherein the abrasive article comprises an abrasive particle content of not greater than about 25 vol. % for a total volume of abrasive article.

11. The composite film of claim 1, wherein the abrasive article further comprises a porosity content of at least about 2 vol. % for a total volume of abrasive article.

12. The composite film of claim 11, wherein the abrasive article further comprises a porosity content of not greater than about 20 vol. % for a total volume of abrasive article.

13. An abrasive article comprising a body, wherein the body comprises:
a bond component; and
abrasive particles within the bond component,
wherein the bond component comprises a Fe—Co—Cu—Ni—Sn based bond material and a performance enhancing material,
wherein the total content of Fe, Co, Cu, Ni and Sn accounts for at least about 50 vol. % for a total volume of the bond material,
wherein the bond component comprises an Fe content of at least about 30 vol. % and not greater than about 70 vol. %,
wherein the bond component comprises a Co content of at least about 5 vol. % and not greater than about 25 vol. %,
wherein the bond component comprises a Cu content of at least about 20 vol. % and not greater than about 50 vol. %,
wherein the bond component comprises a Ni content of at least about 5 vol. % and not greater than about 30 vol. %,
wherein the bond component comprises a Sn content of at least about 2 vol. % and not greater than about 20 vol. %,
wherein the performance enhancing material comprises hexagonal boron nitride, and
wherein the body comprises a hardness of at least about 50 HRB and not greater than about 85 HRB.

14. The composite film of claim 13, wherein the performance enhancing component consists of hexagonal boron nitride.

15. The composite film of claim 13, wherein the performance enhancing component has an average particle size of at least about 10 microns.

16. The composite film of claim 15, wherein the performance enhancing component has an average particle size of not greater than about 12 microns.

17. The composite film of claim 13, wherein the abrasive article comprises a bond component content of at least about 55 vol. % for a total volume of abrasive article.

18. The composite film of claim 17, wherein the abrasive article comprises a bond component content of not greater than about 95 vol. % for a total volume of abrasive article.

19. The composite film of claim 13, wherein the abrasive article further comprises a porosity content of at least about 2 vol. % and not greater than about 20 vol. % for a total volume of abrasive article.

20. An abrasive article comprising a body, wherein the body comprises:
a continuous bond material phase;
abrasive particles within the continuous bond material phase; and
a discontinuous performance enhancing material phase dispersed within the continuous bond material phase,
wherein the bond material phase comprises an Fe—Co—Cu—Ni—Sn based bond material,
wherein the total content of Fe, Co, Cu, Ni and Sn accounts for at least about 50 vol. % for a total volume of the bond material,
wherein the bond component comprises an Fe content of at least about 30 vol. % and not greater than about 70 vol. %,
wherein the bond component comprises a Co content of at least about 5 vol. % and not greater than about 25 vol. %,
wherein the bond component comprises a Cu content of at least about 20 vol. % and not greater than about 50 vol. %,
wherein the bond component comprises a Ni content of at least about 5 vol. % and not greater than about 30 vol. %,
wherein the bond component comprises a Sn content of at least about 2 vol. % and not greater than about 20 vol. %, and
wherein a hardness of the performance enhancing material phase $H_{PEMP}$ is less than a hardness of the bond material phase $H_{BMP}$.

* * * * *